(12) United States Patent
Choi et al.

(10) Patent No.: US 12,136,154 B2
(45) Date of Patent: Nov. 5, 2024

(54) ELECTRONIC DEVICE AND METHOD FOR DISPLAYING CONTENT BASED ON TRANSFORMATION OF DISPLAY

(71) Applicant: SAMSUNG ELECTRONICS CO., LTD., Suwon-si (KR)

(72) Inventors: Yoonjung Choi, Suwon-si (KR); Jiyoung Kang, Suwon-si (KR); Chaekyung Lee, Suwon-si (KR); Yejin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/120,717

(22) Filed: Mar. 13, 2023

(65) Prior Publication Data

US 2023/0334739 A1 Oct. 19, 2023

Related U.S. Application Data

(63) Continuation of application No. PCT/KR2023/000747, filed on Jan. 16, 2023.

(30) Foreign Application Priority Data

Apr. 19, 2022 (KR) .................. 10-2022-0047996
Jul. 5, 2022 (KR) .................. 10-2022-0082533

(51) Int. Cl.
*G06F 3/03* (2006.01)
*G06T 3/40* (2024.01)
(Continued)

(52) U.S. Cl.
CPC ............... *G06T 11/60* (2013.01); *G06F 3/03* (2013.01); *G06T 3/40* (2013.01); *H04M 1/0241* (2013.01);
(Continued)

(58) Field of Classification Search
CPC ...... G06T 11/60; G06T 3/40; H04M 1/72436; H04M 1/0241; H04M 1/0214; G06F 3/03
See application file for complete search history.

(56) References Cited

U.S. PATENT DOCUMENTS 7,643,742 B2   1/2010   Watanabe et al.
8,947,459 B2   2/2015   Osuga et al.
(Continued)

FOREIGN PATENT DOCUMENTS

JP   4832518 B2   12/2011
JP   5742354 B2   7/2015
(Continued)

OTHER PUBLICATIONS

International Search Report dated Apr. 24, 2023, issued by the International Searching Authority in International Application No. PCT/KR2023/000747 (PCT/ISA/210).
(Continued)

*Primary Examiner* — Stephen G Sherman
(74) *Attorney, Agent, or Firm* — Sughrue Mion, PLLC

(57) ABSTRACT

According to an embodiment, a processor of an electronic device identifies a plurality of subjects associated with the content, based on a request to display content within an active area of the display. The processor obtains a sequence of the plurality of subjects based on the plurality of subjects from the content. The processor displays a plurality of visual objects corresponding to each of the plurality of subjects based on the sequence and display the content according to a first magnification. The processor displays, among a first portion of the content corresponding to at least one subject selected based on the sequence among the plurality of subjects, or a second portion of the content different from the first portion, the first portion in the active area, based on a (Continued)

size of the active area controlled by the actuator by adjusting a magnification of the content to a second magnification.

13 Claims, 27 Drawing Sheets

(51) Int. Cl.
*G06T 11/60* (2006.01)
*H04M 1/02* (2006.01)
*H04M 1/72436* (2021.01)

(52) U.S. Cl.
CPC ...... *H04M 1/72436* (2021.01); *H04M 1/0214* (2013.01)

(56) References Cited

U.S. PATENT DOCUMENTS

| | | | |
|---|---|---|---|
| 10,488,947 B2 | 11/2019 | Kwon et al. | |
| 10,929,002 B2* | 2/2021 | Lee | G06F 3/04883 |
| 11,244,658 B1* | 2/2022 | Hong | G06F 1/1624 |
| 11,410,583 B2 | 8/2022 | Kim et al. | |
| 2018/0332233 A1 | 11/2018 | Lee et al. | |
| 2019/0065035 A1 | 2/2019 | Lee et al. | |
| 2019/0279407 A1 | 9/2019 | McHugh et al. | |
| 2021/0034210 A1 | 2/2021 | Chung et al. | |
| 2021/0390893 A1 | 12/2021 | Woo et al. | |
| 2022/0279666 A1 | 9/2022 | Park et al. | |

FOREIGN PATENT DOCUMENTS

| | | |
|---|---|---|
| KR | 10-2017-0053273 A | 5/2017 |
| KR | 10-2019-0021042 A | 3/2019 |
| KR | 10-2019-0098340 A | 8/2019 |
| KR | 10-2019-0106769 A | 9/2019 |
| KR | 10-2021-0074254 A | 6/2021 |
| KR | 10-2289369 B1 | 8/2021 |
| KR | 10-2359544 B1 | 2/2022 |

OTHER PUBLICATIONS

Written Opinion dated Apr. 24, 2023, issued by the International Searching Authority in International Application No. PCT/KR2023/000747 (PCT/ISA/237).

* cited by examiner

ELECTRONIC DEVICE AND METHOD FOR DISPLAYING CONTENT BASED ON TRANSFORMATION OF DISPLAY

CROSS-REFERENCE TO RELATED APPLICATION(S)

This application is a continuation of PCT International Application No. PCT/KR2023/000747, which was filed on Jan. 16, 2023, and claims priority to Korean Patent Application No. 10-2022-0047996, filed on Apr. 19, 2022, and Korean Patent Application No. 10-2022-0082533, filed on Jul. 5, 2022, in the Korean Intellectual Property Office, the disclosures of which are incorporated by reference herein their entireties.

BACKGROUND

1. Technical Field

The disclosure relates to an electronic device and a method for displaying a content based on a transformation of a display.

2. Description of Related Art

An electronic device having a deformable form factor using a flexible display has been developed. For example, an electronic device including a plurality of foldable housings may provide a user with a user experience based on a shape of the electronic device by using a flexible display disposed across the plurality of housings. For example, the electronic device may modify content displayed on the flexible display based on the shape of the flexible display that is folded or unfolded by the user's external force. As another example, an electronic device for folding or unfolding a flexible display has been developed.

SUMMARY

According to an embodiment, an electronic device may comprise a housing; a display; an actuator configured to adjust an active area of the display by controlling a position of the display relative to the housing; a memory for storing instructions; and at least one processor operably coupled to the display, the actuator, and the memory. The at least one processor may be configured to execute the instructions to, receive a request for displaying a content in the active area. The at least one processor may be configured to execute the instructions to identify, based on the request, a plurality of subjects associated with the content. The at least one processor may be configured to execute the instructions to obtain, based on the identification of the plurality of subjects from the content, a sequence of the plurality of subjects. The at least one processor may be configured to execute the instructions to display, in the active area of the display, a plurality of visual objects respectively corresponding to the plurality of subjects based on the sequence and display the content according to a first magnification. The at least one processor may be configured to execute the instructions to display, based on a size of the active area controlled by the actuator, among a first portion of the content corresponding to at least one subject selected based on the sequence and a second portion of the content different from the first portion, the first portion with the plurality of visual objects in the active area by adjusting a magnification of the content from the first magnification to a second magnification that is greater than the first magnification.

According to an embodiment, an electronic device may comprise a housing; a display; an actuator configured to adjust an active area of the display by controlling a position of the display relative to the housing; a memory for storing instructions; and at least one processor operably coupled to the display, the actuator, and the memory. The at least one processor is configured to execute the instructions to identify a content stored in the memory. The content may associated with at least one subject. The at least one processor is configured to execute the instructions to obtain a size of the active area that is adjusted based on at least one of an insertion of the display into the housing and an extraction of the display from the housing. The at least one processor is configured to display, based on the display being in a first state in which the size of the active area is greater than a preset size, the content based on a first magnification of the content. The at least one processor is configured to display, based on the display being in a second state in which the size of the active area is smaller than the preset size, display at least a portion of the content based on a second magnification which is associated with a location corresponding to the at least one subject, and is greater than the first magnification.

According to an embodiment, a method of an electronic device may comprise receiving a request for displaying a content in an active area of a display of the electronic device. The method may comprise identifying, based on the request, a plurality of subjects associated with the content. The method may comprise obtaining, based on identifying the plurality of subjects from the content, a sequence of the plurality of subjects. The method may comprise displaying, based on the sequence, in the active area of the display, a plurality of visual objects corresponding to each of the plurality of subjects, and displaying the content according to a first magnification. The method may comprise adjusting a size of the active area by controlling an actuator to transform the display. The method may comprise displaying, based on a size of the active area that is controlled by the actuator, among a first portion of the content corresponding to at least one subject selected based on the sequence among the plurality of subjects, or a second portion of the content different from the first portion, the first portion with the plurality of visual objects in the active area by adjusting a magnification of the content from the first magnification to a second magnification that is greater than the first magnification.

According to an embodiment, an electronic device may comprise a housing; a display; an actuator for adjust a displaying area of the display, by inserting the display into the housing, or by extracting the display from the housing; a memory for storing instructions; and at least one processor operably coupled to the display, the actuator, and the memory. The at least one processor may be configured to, when the instructions are executed, receive a request for displaying a content in the displaying area. The at least one processor may be configured to identify, when the instructions are executed, in response to the request, a plurality of subjects captured in the content. The at least one processor may be configured to obtain, when the instructions are executed, in response to identification of the plurality of subjects from the content, a sequence of the plurality of subjects. The at least one processor may be configured to display, when the instructions are executed, a plurality of visual objects respectively corresponding to the plurality of subjects in the displaying area based on the obtained sequence. The at least one processor may be configured to display, when the instructions are executed, among a first portion of the content in which at least one subject selected based on the sequence among the plurality of subjects is captured and a second portion of the content different from the first portion, the first portion with the plurality of visual objects in the displaying area.

According to an embodiment, an electronic device may comprise a housing; a display; an actuator for adjust a displaying area of the display, by inserting the display into the housing, or by extracting the display from the housing; a memory for storing instructions; at least one processor operably coupled to the display, the actuator, and the memory. The at least one processor may be configured to, when the instructions are executed, identify a content in which one or more subjects are captured, and is stored in the memory. The at least one processor may be configured to, when the instructions are executed, obtain a size of the displaying area that is adjusted based on the insertion of the display, or the extraction of the display. The at least one processor may be configured to, when the instructions are executed, display, in a first state in which the size of the displaying area is greater than a preset size, the content based on a first magnification making the content having a size smaller than the size of the displaying area. The at least one processor may be configured to, when the instructions are executed, display, in a second state in which the size of the displaying area is smaller than a preset size, at least portion of the content based on a second magnification which is associated with a portion of the content where the one or more subjects are captured, and is greater than the first magnification.

According to an embodiment, a method of an electronic device may comprise receiving a request for displaying a content in a displaying area of a display of the electronic device. The method of the electronic device may comprise identifying, in response to the request, a plurality of subjects which are captured in the content. The method of the electronic device may comprise obtaining, in response to identifying the plurality of subjects from the content, a sequence of the plurality of subjects. The method of the electronic device may comprise displaying, in the displaying area based on the obtained sequence, the plurality of visual objects corresponding to each of the plurality of subjects. The method of the electronic device may comprise displaying, based on a size of the displaying area that is controlled by an actuator of the electronic device for transforming the display, among a first portion of the content where at least one subject selected based on the sequence among the plurality of subjects are capture, or a second portion of the content different from the first portion, the first portion with the plurality of visual objects in the displaying area.

According to an embodiment, a method of an electronic device may comprise identifying a content in which one or more subjects are captured. The method of the electronic device may comprise obtaining a size of the displaying area that is adjusted, based on insertion of the display of the electronic device into the housing of the electronic device, or extraction from the housing of the display. The method of the electronic device may comprise displaying, in a first state in which the size of the displaying area is greater than a preset size, the content based on a first magnification making the content having a size smaller than the size of the displaying area. The method of the electronic device may comprise displaying, in a second state in which the size of the displaying area is smaller than a preset size, at least portion of the content based on a second magnification which is associated with a portion of the content where the one or more subjects are captured, and is greater than the first magnification.

DETAILED DESCRIPTION

Figure 1:
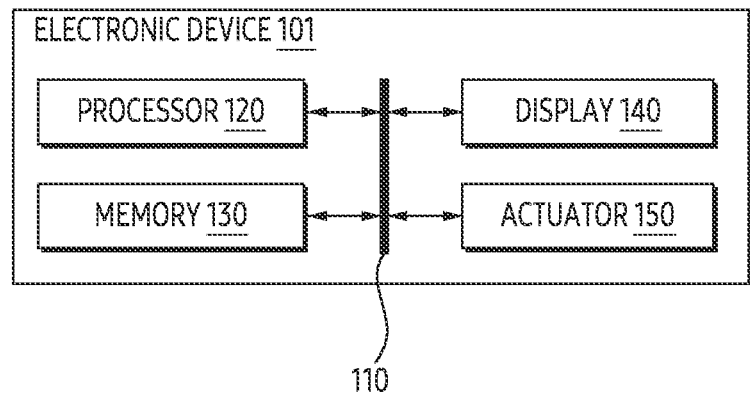
FIG. 1 is a block diagram of an electronic device according to an embodiment.

Hereinafter, various embodiments of the present disclosure will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this disclosure, each of the phrases such as "A or B", "at least one of A and B", "at least one of A, B and C", "at least one of A, B, or C", and "at least one of A, B, or C" should be understood as including only A, only B, only C, both A and B, both A and C, both B and C, or all of A, B, and C. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present disclosure may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram of an electronic device 101 according to an embodiment. Referring to FIG. 1, the electronic device 101 may include at least one of a processor 120, a memory 130, a display 140, and an actuator 150. The processor 120, memory 130, display 140, and actuator 150 may be electrically and/or operably coupled with each other by electronic components such as a communication bus 110. Although illustrated based on different blocks, the embodiment is not limited thereto. The type and/or number of hardware components included in the electronic device 101 are not limited to those illustrated in FIG. 1. For example, the electronic device 101 may include only a portion of the hardware components illustrated in FIG. 1. According to an embodiment, the electronic device 101 may further include a housing forming the appearance of the electronic device 101. The appearance of the electronic device 101 formed by the housing will be described later with reference to FIGS. 2A to 2B.

According to an embodiment, the processor 120 of the electronic device 101 may include a hardware component for processing data based on one or more instructions. For example, the hardware component for processing data may include an arithmetic and logic unit (ALU), a floating point unit (FPU), a field programmable gate array (FPGA), an application processor (AP), and/or a central processing unit (CPU). The number of processors 120 may be one or more. For example, the processor 120 may have a structure of a multicore processor such as a dual core, a quad core, or a hexa core.

According to an embodiment, the memory 130 of the electronic device 101 may include a hardware component for storing data and/or instructions input and/or output to the processor 120. For example, the memory 130 may include a volatile memory such as random-access memory (RAM) and/or a non-volatile memory such as read-only memory (ROM). For example, the volatile memory may include at least one of a dynamic RAM (DRAM), a static RAM (SRAM), a cache RAM, and a pseudo SRAM (PSRAM). For example, the non-volatile memory may include at least one of a programmable ROM (PROM), an erasable PROM (EPROM), an Electrically Erasable PROM (EEPROM), a flash memory, a hard disk, a compact disk, and an Embedded Multimedia Card (eMMC).

In the memory 130, one or more instructions indicating a calculation and/or an operation to be performed by the processor 120 on data may be stored. A set of one or more instructions may be referred to as firmware, operating system, process, routine, sub-routine, and/or application. For example, when a set of a plurality of instructions distributed in the form of an operating system, firmware, driver, and/or application is executed, the electronic device 101 and/or the processor 120 may perform at least one of the operations of FIGS. 9 to 11. Hereinafter, the fact that the application is installed in the electronic device 101 may mean that one or more instructions provided in the form of the application are stored in the memory 130 of the electronic device 101, and the one or more applications are stored in an executable format (e.g., a file with a preset extension by the operating system of the electronic device 101) by the processor 120 of the electronic device 101. For example, the application may include an application for browsing content stored in memory 130, such as a gallery application.

According to an embodiment, the display 140 of the electronic device 101 may output visualized information to a user. In an embodiment, the display 140 may be a flexible display that may be transformed by an external force applied to the display 140. The display 140 may include liquid crystal display (LCD), plasma display panel (PDP), one or more LEDs (Light Emitting Diode), and/or one or more OLEDs. An exemplary structure of the electronic device 101 to transform the shape of the display 140 will be described later with reference to FIGS. 12A to 12D and 13A to 13B.

According to an embodiment, the display 140 may include a sensor (e.g., a touch sensor panel (TSP)) for detecting an external object (e.g., a user's finger) on the display 140. For example, based on the TSP, the electronic device 101 may detect an external object that is in contact with or floating on the display 140. In response to detecting the external object, the electronic device 101 may execute a function related to a specific visual object corresponding to a portion of the display 140 in which the external object is in contact among the visual objects displayed in the display 140.

According to an embodiment, the actuator 150 of the electronic device 101 may modify a shape of the display 140 and/or the electronic device 101. The actuator 150 may be referred to as a driving unit. The actuator 150 may include a hardware (e.g., a motor) for outputting kinetic energy from electrical energy. In an embodiment in which actuator 150 includes a motor, the actuator 150 may include a gear (e.g., rack gear) for modifying the rotational motion of the motor to a linear motion (or translation motion) applied to the display 140. In an embodiment, the actuator 150 may include a plurality of gears engaged to each other to adjust the rotational force (e.g., torque) of the motor. The plurality of gears may be referred to as a gear assembly of the actuator 150 or a transmission unit.

According to an embodiment, the processor 120 may adjust a speed and/or a direction at which display 140 and/or electronic device 101 are transformed by modifying the frequency, voltage, and/or current of the power signal applied to the motor of actuator 150. According to an embodiment, the processor 120 may adjust the speed and/or the direction at which the display 140 and/or the electronic device 101 are transformed by adjusting the positional relationship of a plurality of gears included in the gear assembly and/or the gear ratio between interconnected gears. According to an embodiment, exemplary operations in which the electronic device 101 controls the actuator 150 to adjust the shape of the display 140 will be described later with reference to FIGS. 2A to 2B.

According to an embodiment, the electronic device 101 may insert the display 140 into the housing of the electronic device 101 by controlling the actuator 150, or extract from the housing. Based on the insertion of the display 140 or the extraction of the display 140, the electronic device 101 may adjust the displaying area of the display 140. According to an embodiment, an operation in which the electronic device 101 controls the actuator 150 to adjust the displaying area will be described later with reference to FIGS. 2A to 2B.

According to an embodiment, the electronic device 101 may display a content in a displaying area formed on the display 140. The content may include at least one of an image such as a photograph or a video including a sequence of a plurality of frames. For example, the content may have a format based on JPEG (Joint Photographic Experts Group) and/or Moving Picture Experts Group (MPEG). For example, the content may indicate an image captured within at least one time point based on pixels of a two-dimensional plane displayed substantially simultaneously. According to an embodiment, the electronic device 101 may selectively display a portion of the content based on a width, a height, a size, and/or an extent of the displaying area related to a shape of the display 140, adjusted by actuator 150. For example, the electronic device 101 may selectively display one or more subjects captured in the content. According to an embodiment, an operation of the electronic device 101 identifying the one or more subjects captured in the content will be described with reference to FIGS. 3 and/or FIGS. 7A to 7B. According to an embodiment, an operation in which the electronic device 101 selectively displays the one or more subjects will be described with reference to FIGS. 4A to 4E, FIG. 5, FIGS. 6A to 6B, FIGS. 7A to 7B, and/or 8A to 8D.

According to an embodiment, the electronic device 101 may expand or reduce the content based on the expansion or reduction of the displaying area based on the transformation of the display 140. For example, while the display 140 is at least partially inserted into the housing of the electronic device 101, the size of the displaying area may be reduced based on the insertion of the display 140. Within the reduced displaying area, the electronic device 101 may display a portion of the plurality of pixels corresponding to one or more subjects among the plurality of pixels, independently of displaying the entire plurality of pixels included in the content and captured substantially simultaneously. Since a portion of the plurality of pixels corresponding to the one or more subjects is displayed, the electronic device 101 may intensively output the one or more subjects to the user independently of the control of the displaying area.

As described above, according to an embodiment, the electronic device 101 may expand one or more subjects included in the content in order to improve visibility and/or detectability of the content due to the reduction of the displaying area. In order to expand the one or more subjects, the electronic device 101 may selectively display a portion in which the one or more subjects are captured in the content. While the portion of the content is selectively displayed, the electronic device 101 may visually indicate the location of the displayed portion in the content.

Hereinafter, an operation in which the electronic device 101 adjusts a width, a height, a size, and/or an extent of the displaying area according to an embodiment will be described with reference to FIGS. 2A to 2B.

Figure 2A:
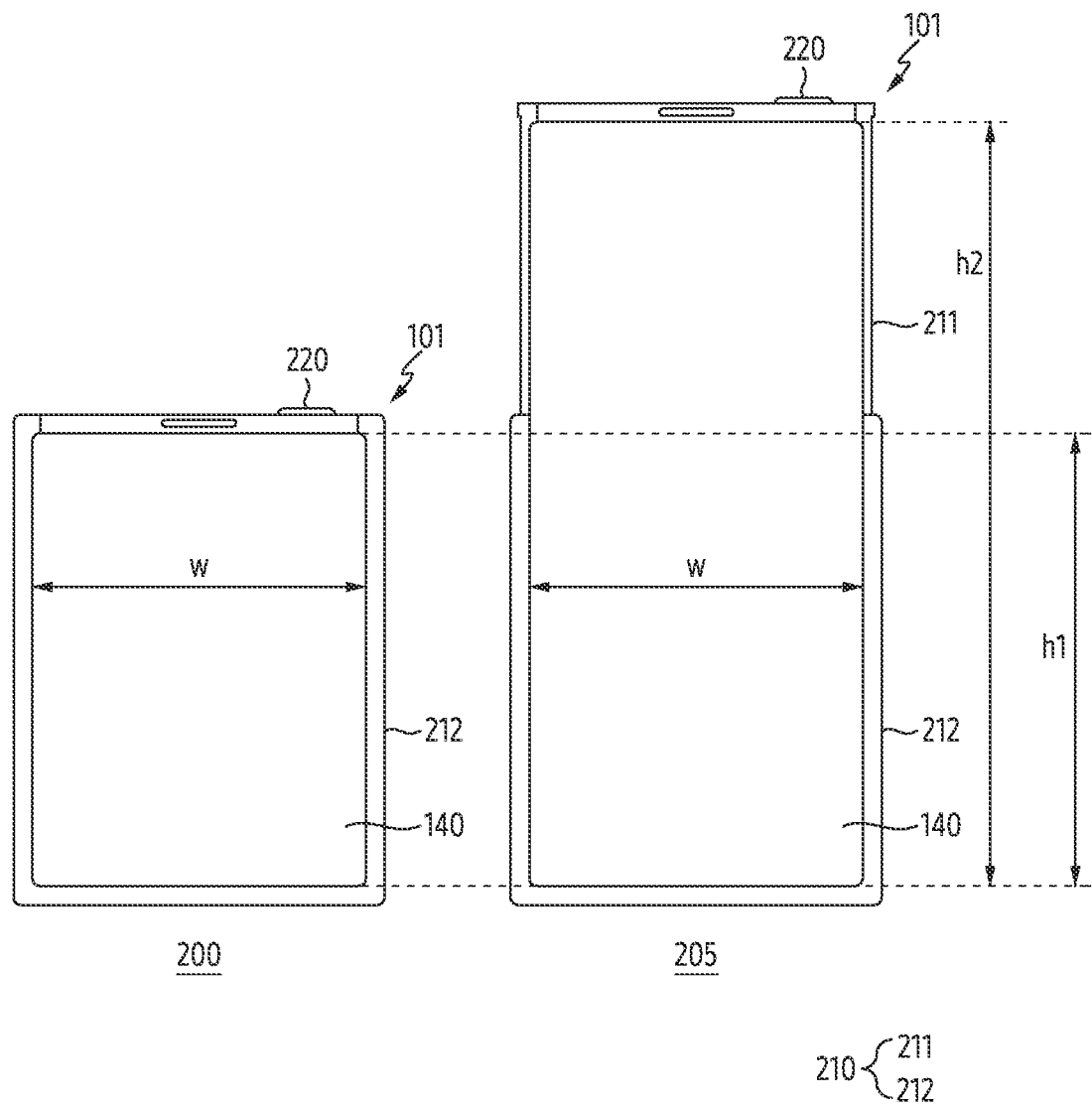
FIGS. 2A to 2B are exemplary views for describing an operation in which an electronic device is transformed between states in different shapes, according to an embodiment.
Figure 2B:
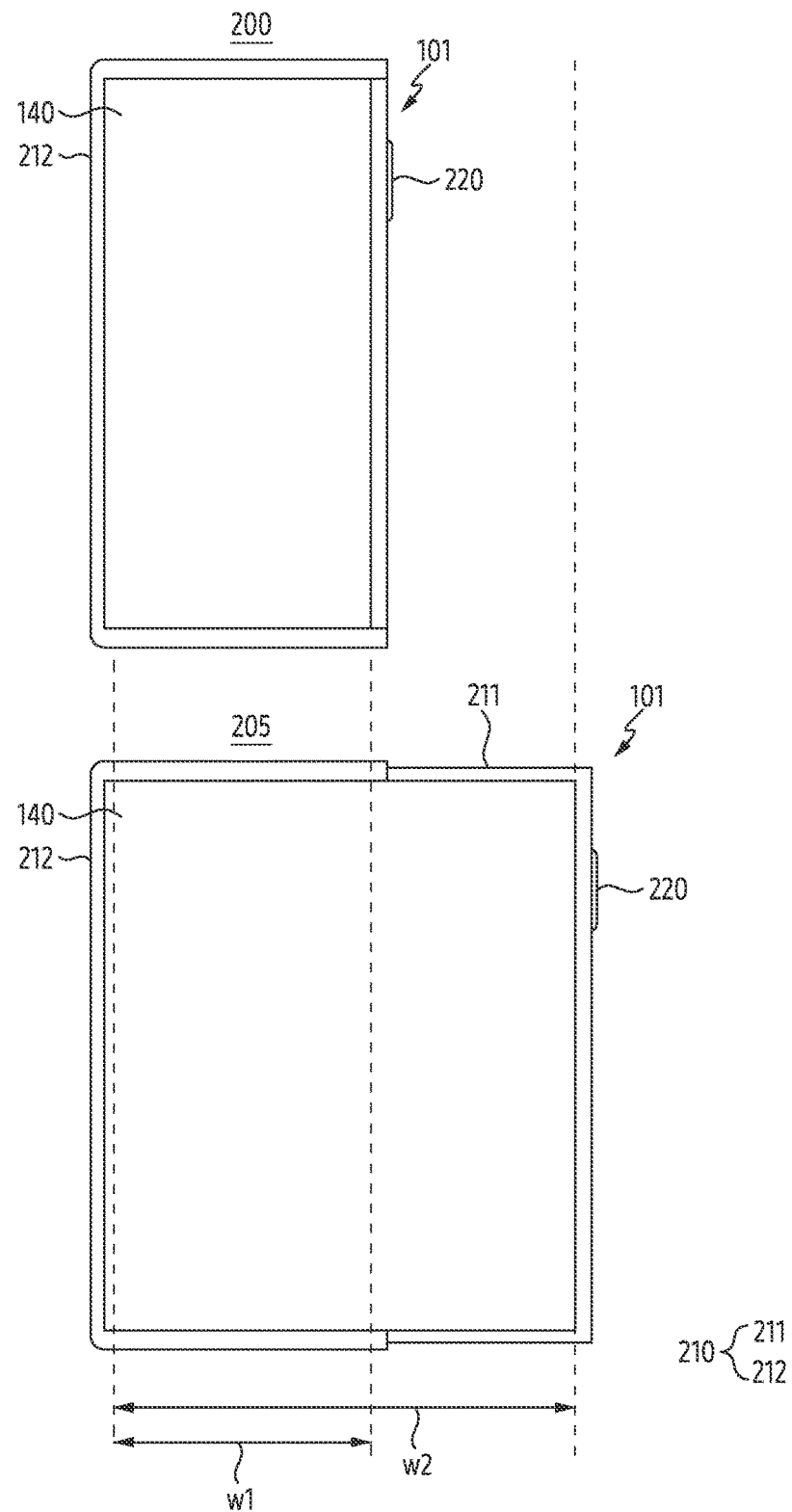

FIGS. 2A to 2B are exemplary diagrams for describing an operation in which an electronic device according to an embodiment is transformed between states in different shapes. The electronic device 101 of FIGS. 2A to 2B may be an example of the electronic device 101 of FIG. 1. For example, the electronic device 101 and the display 140 of FIG. 1 may include the electronic device 101 and the display 140 of FIGS. 2A to 2B.

Referring to FIGS. 2A to 2B, the electronic device 101 may be a terminal owned by a user. For example, the terminal may include a personal computer (PC) such as a laptop and a desktop, a smartphone, a smart pad, a tablet PC, a smartwatch, and a smart accessory such as a head-mounted device (HMD). According to an embodiment, the housing 210 of the electronic device 101 may include an internal space on which one or more hardware components (e.g., one or more hardware described above with reference to FIG. 1) included in the electronic device 101 are disposed. The housing 210 may form an external shape of the electronic device 101.

According to an embodiment, the electronic device 101 may have a deformable form factor. The transformation of the electronic device 101 may mean that at least one of the dimensions such as the width, height, and/or thickness of the electronic device 101 is modified. At least one of the dimensions may be manually modified by an external force applied to the electronic device 101, and/or may be actively modified by one or more actuators included in the electronic device 101 (e.g., actuator 150 in FIG. 1).

In order to support deformability of the electronic device 101, the housing 210 may be divided into an interconnected first housing 211 and a second housing 212. According to an embodiment, the electronic device 101 may modify the shape of the display 140 and/or the electronic device 101 by adjusting the positional relationship between the first housing 211 and the second housing 212 using the actuator 150. Referring to FIGS. 2A to 2B, the display 140 of the electronic device 101 may be disposed across one surface of the first housing 211 and one surface of the second housing 212. One surface on which the display 140 is disposed and formed by the first housing 211 and the second housing 212 may be referred to as a front surface. According to an embodiment, modifying the shape of the display 140 by the electronic device 101 may include modifying at least one of a width, a height and/or an extent of at least a portion exposed to the outside within the display 140.

Referring to FIGS. 2A to 2B, an embodiment in which the second housing 212 is slidably coupled to the first housing 211 will be shown. However, the embodiments are not limited thereto. The display 140 may be insertable into the second housing 212 or extractable from the second housing 212 based on the transformation of the electronic device 101. When the display 140 is inserted into the second housing 212, the size of an area in which the display 140 is exposed to the outside may be reduced. When the display 140 is extracted from the second housing 212, the size of an area in which the display 140 is exposed to the outside may be increased. Hereinafter, a displaying area of the display 140 may mean an area formed by pixels disposed on the area in which the display 140 is exposed to the outside, among the pixels included in the display 140. For example, the displaying area may be referred to as an active area of the display 140. According to an embodiment, the electronic device 101 may adjust the displaying area by inserting the display 140 into the housing 210 or extracting from the housing 210 by using the actuator (e.g., the actuator 150 in FIG. 1).

Referring to FIGS. 2A to 2B, different states 200 and 205 of the electronic device 101 and/or the display 140 are illustrated. According to an embodiment, the electronic device 101 may switch between states 200 and 205 using an actuator (e.g., actuator 150 of FIG. 1). According to an embodiment, the states 200 and 205 of the electronic device 101 may be distinguished according to the sizes of the electronic device 101 and/or the display 140 (e.g., a width, a height, a thickness, and/or an aspect ratio). The states 200 and 205 may be distinguished according to a distance between the first housing 211 and the second housing 212 of the electronic device 101. For example, the distance between the first housing 211 and the second housing 212 may be a distance between one surface of the first housing 211 (e.g., the upper surface of the first housing 211) and the other surface of the second housing 212 parallel to the one surface of the first housing 211 and spaced apart from the one surface of the first housing 211.

As the electronic device 101 is transformed, each of the states 200 and 205 of FIGS. 2A to 2B may be in a state in which a surface area of the electronic device 101 and/or an area of the displaying area of the display 140 is minimized or maximized. Hereinafter, a state in which the surface area of the electronic device 101 and/or the displaying area is minimized such as the state 200 may be referred to as a slide-in state, a rolled state, a closed state, a roll-in state, and/or a contracted state. Hereinafter, a state in which the surface area of the electronic device 101 and/or the displaying area is maximized such as the state 205 may be referred to as a slide-out state, an unrolled state, an opened state, a roll-out state, and/or an extended state. In an embodiment, the state of the electronic device 101 may further include other state between a state 200 in which the area of the displaying area is the minimum and a state 205 in which the area of the displaying area is the maximum. The other states may be referred to as an intermediate state, a sub-rolled state, or a sub-opened state.

Referring to FIGS. 2A to 2B, according to an embodiment, the display 140 included in the electronic device 101 may have a rectangular shape. In an embodiment, the corners of the display 140 may have a rounded corner shape. Hereinafter, among the sides that are the boundary of the rectangular display 140, a first direction parallel to a relatively long side may be referred to as a height direction, and the relatively long side may be referred to as a height. Hereinafter, among the sides that are the boundary of the rectangular display 140, a second direction parallel to the relatively short side may be referred to as a width direction, and the relatively short side may be referred to as a width.

Referring to FIG. 2A, an embodiment in which the electronic device 101 transforms the shape of the electronic device 101 in the height direction among the width direction or height direction of the display 140 is illustrated. The height h1 in the state 200 of FIG. 2A may be a minimum value of the height of the displaying area at a time point (e.g., the slide-in state) at which an area of a portion of the display 140 exposed to the outside is minimized. For example, with respect to the width w of the displaying area, the ratio of the height and the width in the state 200 may be 4.5:3. The height h2 of the display 140 in the state 205 of FIG. 2A may be the maximum value of the height of the displaying area at a time point (e.g., the slide-out state) at which an area of a portion of the display 140 exposed to the outside is maximized. For example, with respect to the width w of the displaying area, the ratio of the height and the width in the state 205 may be 21:9. The height h2 of the display 140 in the state 205 of FIG. 2A may be the maximum value of the height of the transformable display 140. According to an embodiment, the state of the electronic device 101 may include not only states 200 and 205, but also an intermediate state in which the height and width ratio are 16:9.

Referring to FIG. 2B, an embodiment in which the electronic device 101 transforms a shape of the electronic device 101 in the width direction among the width direction or the height direction is illustrated. Each of the width w1 in the state 200 of FIG. 2B and the width w2 in the state 205 may be a minimum value and a maximum value of the width of the transformable display 140. As the height and/or width of the display 140 is adjusted, the electronic device 101 may modify an aspect ratio of the display 140 to an aspect ratio suitable for content output from the electronic device 101. For example, the aspect ratio may be selected from 4.5:3, 16:9, and 21:9.

According to an embodiment, the electronic device 101 may identify a state corresponding to a current shape of the electronic device 101 among states 200, 205, and intermediate states between states 200 and 205, by using one or more sensors (e.g., hall sensors). In an embodiment in which the electronic device 101 includes a hall sensor, a magnet included in the hole sensor may be disposed in the first housing 211, and one or more magnetic sensors included in the hole sensor may be disposed in the second housing 212. In an embodiment, the size of the magnetic field identified by each of the one or more magnetic sensors and generated from the magnet may be modified according to a positional relationship between the first housing 211 and the second housing 212. In an embodiment, the electronic device 101 may identify the shape of the electronic device 101 based on the size of the magnetic field identified by the one or more magnetic sensors. The identification of the shape by the electronic device 101 may be performed based on an operating system and/or firmware executed on the processor of the electronic device 101 (e.g., the processor 120 of FIG. 1).

According to an embodiment, the electronic device 101 may modify the shape of the display 140 and/or the electronic device 101 between states 200 and 205 by activating the actuator (e.g., the actuator 150 in FIG. 1). According to an embodiment, the electronic device 101 may modify the shape in response to identifying a preset event. For example, the preset event may include a software interrupt (SWI) generated by an operating system, a firmware, and/or application executed on the electronic device 101. The software interrupt may be generated by an application for playing multimedia content (e.g., video) having a specific aspect ratio. The software interrupt may be generated based on the location of the electronic device 101 identified by one or more sensors. The software interrupt may be generated based on a condition (e.g., time, place, occasion, or condition indicated by a combination thereof) input by the electronic device 101 and/or the user.

In an embodiment, a preset event for modifying the shape of the display 140 and/or the electronic device 101 may be generated based on a user's gesture. For example, the preset event may be generated by a gesture performed on display 140. The gesture may include at least one of a pinch-to-zoom gesture, a swipe gesture, a drag gesture, or a gesture of touching a preset visual object (e.g., an icon displaying an aspect ratio) displayed on the display 140. For example, the gesture may be generated by a gesture of pressing the button 220 exposed to the outside in a portion of the housing 210 of the electronic device 101.

According to an embodiment, the electronic device 101 may include a display 140 and/or a button 220 for receiving an input for modifying the shape of the electronic device 101. Referring to FIGS. 2A to 2B, a button 220 exposed to the outside from at least a portion of the housing 210 of the electronic device 101 is illustrated. In response to identifying the gesture of pressing the button 220, the electronic device 101 may identify the input by the user. In an embodiment where the button 220 maps to a plurality of functions (e.g., a power management function, and/or a fingerprint recognition function), the electronic device 101 may identify the input based on a pressure of pressing the button 220, a duration that an external object (e.g., the user's fingertip) is in contact with the button 220, and/or a duration that the button 220 is pressed. For example, a first gesture of pressing the button 220 beyond a preset duration (e.g., 5 seconds) may be matched to an input of turning on or off the electronic device 101. In the above example, a second gesture of pressing the button 220 shorter than the preset duration may be matched to an input for modifying the shape.

Referring to an embodiment of FIG. 2A, the button 220 may be exposed to the outside through an upper surface of the first housing 211. Referring to FIG. 2B, the button 220 may be exposed to the outside through a side surface of the first housing 211. The position of the button 220 is not limited to the examples of FIG. 2A and/or FIG. 2B.

In an embodiment, a preset event for modifying the shape of display 140 and/or electronic device 101 may be generated based on the electronic device 101 receiving a voice signal including a preset word and/or sentence. According to an embodiment, the electronic device 101 may obtain the voice signal using one or more microphones. The preset event may be generated in response to the electronic device 101 receiving a wireless signal from an external electronic device (e.g., a remote control wirelessly connected to the electronic device 101 and/or pointing devices such as digitizers). The wireless signal may be transmitted from the external electronic device to the electronic device 101 based on a user's gesture identified through the external electronic device. For example, the gesture identified by the external electronic device may include at least one of a movement of the external electronic device following a preset trajectory and/or a gesture of pressing a button of the external electronic device. The trajectory may be referred to as a path.

According to an embodiment, in response to a preset event for changing the shape of the display 140 and/or the electronic device 101, the electronic device 101 may control the actuator based on the current shape of the electronic device 101 identified among states 200, 205 and intermediate states between states 200, 205. A size and/or area such as a width and/or a height of the displaying area may be adjusted, based on the control of the actuator. Referring to FIGS. 2A to 2B, the area of the displaying area may be minimized within a roll-in state such as state 200, and the area of the displaying area may be maximized within a roll-out state such as state 205. According to an embodiment, the electronic device 101 may identify a change in the displaying area while displaying the content in the displaying area formed on the display 140. Instead of expanding or reducing the content in proportion to the size and/or area of the displaying area, the electronic device 101 may expand a portion in which one or more subjects are captured in the content to improve visibility of the one or more subjects.

As described above, according to an embodiment, the electronic device 101 may identify expansion or reduction of the displaying area by the transformation of the electronic device 101 and/or the display 140 in states 200, 205. Instead of reducing the content displayed in the displaying area, in response to identifying the reduction of the displaying area, the electronic device 101 may expand a portion in which one or more subjects are captured in the content. Since the one or more subjects expand a portion of the captured content based on the reduction of the above displaying area, the electronic device 101 may preferentially display the one or more subjects.

Hereinafter, referring to FIG. 3, an operation in which the electronic device 101 identifies one or more subjects from the content will be described.

Figure 3:
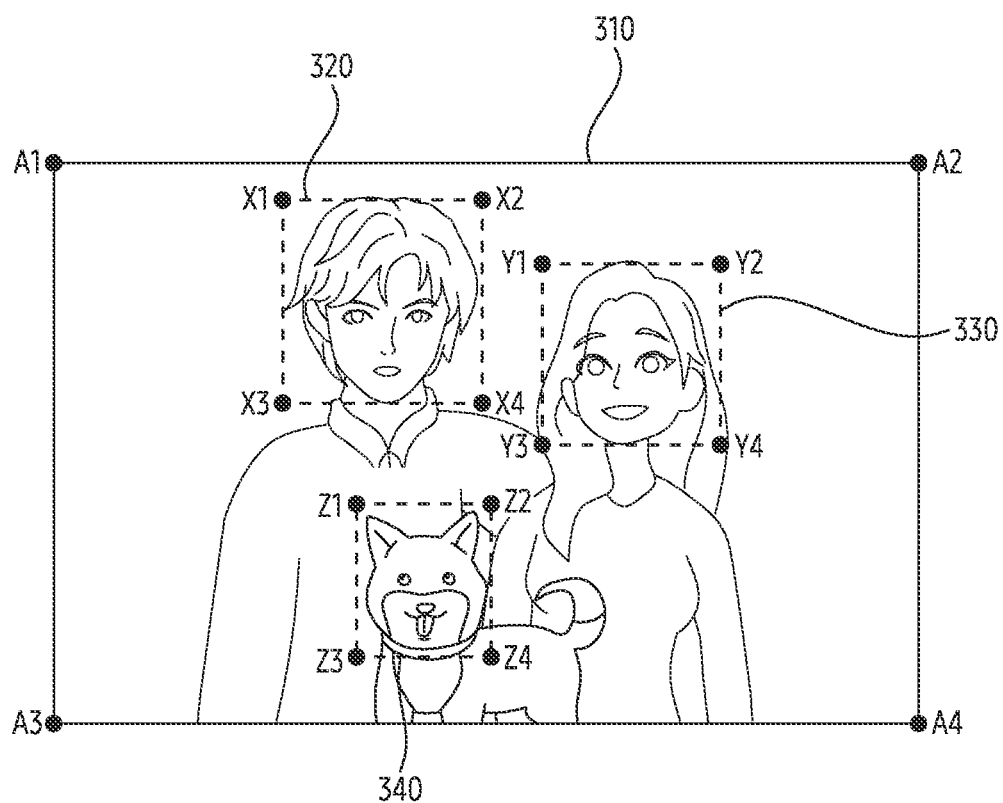
FIG. 3 is a diagram for describing an operation of identifying one or more subjects captured in a content by an electronic device, according to an embodiment.

FIG. 3 is a diagram for describing an operation of identifying one or more subjects captured in a content 310 by an electronic device, according to an embodiment. The electronic device of FIG. 3 may be an example of the electronic device 101 of FIGS. 1 and 2A to 2B. Referring to FIG. 3, an example of the content 310 identified by an electronic device according to an embodiment is illustrated. An operation of the electronic device is described based on the content 310, which is a picture in which three subjects are captured, but the embodiment is not limited thereto.

According to an embodiment, the electronic device may identify the content 310 stored in the memory (e.g., the memory 130 of FIG. 1). The electronic device may identify one or more subjects captured in the content 310. Identifying the one or more subjects may be performed at the time when the content 310 is captured or/and stored. Hereinafter, the subject may mean an object specified by an electronic device and/or a user among objects captured in the content 310. For example, an electronic device may identify a subject based on a neural network such as a convolutional neural network (CNN), and/or one or more feature points included within the content 310.

According to an embodiment, the electronic device may identify one or more subjects captured in the content 310 based on an application such as a contents management hub (CMH). For example, the electronic device may identify one or more subjects based on the location (e.g., Global Positioning System (GPS) coordinates) where the content 310 is captured, the time when the content 310 is captured (e.g., timestamp), and/or one or more tags assigned to the content 310. For example, the tag may be text input from a user. For example, the user may add the names (e.g., in the content 310 where a person is captured, the person's name) of one or more subjects captured in the content 310 to the metadata of the content 310.

According to an embodiment, the electronic device may identify one or more subjects from the content 310 based on the preset categories. For example, the preset categories may include a person distinguished based on a face, one or more tags assigned as the content 310, a shot type, a document, an object, a landscape, a place, an action, color, and/or emotion. According to an embodiment, the electronic device may identify one or more subjects based on a relationship between each of the preset categories and the content 310.

According to an embodiment, the electronic device may obtain information indicating one or more subjects from metadata embedded in the content 310. The information may include at least one of a location and/or an area within the content 310 where one or more subjects are captured, a type of the one or more subjects, or the tag assigned to the one or more subjects. Referring to FIG. 3, areas 320, 330, and 340 in which one or more subjects are captured, which the electronic device identifies from the obtained information, are illustrated. For example, the electronic device may obtain the areas 320 and 330 in which the person is captured based on face recognition and/or tags assigned by the user. In an embodiment of recognizing the face of the person captured in the content 310, the electronic device may identify a person captured in common with the plurality of contents by clustering (e.g., face clustering) one or more faces captured in a plurality of contents stored in memory.

For example, the electronic device may obtain the area 340 in which objects distinguished from people are captured based on image recognition, and/or tags assigned by the user, based on the neural network. Although an embodiment in which the electronic device obtains the area 340 in which the animal (e.g., dog) is captured is illustrated, the embodiment is not limited thereto, and the electronic device may identify different types of objects.

Referring to FIG. 3, an embodiment where an electronic device identifies subjects based on rectangular areas 320, 330, and 340 such as a bounding box is illustrated. For example, the electronic device may identify the areas 320, 330, and 340 based on information including a corner of quadrangle, a width, and a height. Within the example, the metadata of the content 310 may include, as information indicating the area 320, a corner (e.g., coordinates within content 310 in point X1), a width (e.g., the difference between the x-coordinates of X2, and X1), and a height (e.g., the difference between they coordinates of points X3, and X1) of area 320 within metadata of the content 310. For example, the electronic device may identify the areas 320, 330, and 340, based on coordinates of two corners faced away each other, among corners of the quadrangle. For example, the electronic device may identify the area 330 by obtaining coordinates in the content 310 of points Y1 and Y4 from the metadata of the content 310. The embodiment is not limited thereto, and one or more subjects may be identified based on other polygons different from the quadrangle, circles, and/or closed curves indicating the subjects.

According to an embodiment, the electronic device may prioritize the plurality of subjects in response to identifying a plurality of subjects from the content 310, such as areas 320, 330, and 340. For example, the electronic device may obtain a sequence for selectively displaying at least one of the plurality of subjects. The electronic device may obtain the sequence based on the types of each of the plurality of subjects. For example, the electronic device may make a rank of subjects (e.g., subjects corresponding to area 320 and 330) classified as people higher than the rank of other subjects (e.g., subjects corresponding to area 340) classified as objects, among the plurality of subjects in the above sequence. For example, the electronic device may obtain the sequence based on the focal distance within the content and/or the zoom magnification.

According to an embodiment, the electronic device may prioritize the plurality of subjects based on at least one of captured scene recognition in the content, emotional information included in the content, or movement captured in the content (e.g., subject movement, and/or hand gesture). The scene recognition may include an operation of obtaining a text indicating a situation captured in the content (e.g., birthday congratulation, and/or fireworks).

According to an embodiment, the electronic device may obtain a sequence of a plurality of subjects captured in the content 310 based on information stored in the electronic device independently of the content 310 or account information of the user of the electronic device. For example, the electronic device may identify a person captured in the content 310 from among people included in the contact information by comparing the tag assigned to the content 310 and the contact information obtained from the user of the electronic device. The electronic device may make the rank of the person higher than rank of other subjects in the sequence. The electronic device may obtain a sequence of the plurality of subjects based on one or more people to which the content 310 is shared or transmitted. For example, when the person who receives the content 310 corresponds to one of the plurality of subjects, the electronic device may make the subject rank higher than the other subjects.

According to an embodiment, the electronic device may obtain a sequence of the plurality of subjects based on the positions and/or sizes of the plurality of subjects captured in the content 310. For example, the electronic device may identify distances of a plurality of subjects from a center point (e.g., the intersection of a first line segment connecting points A1, A4, and a second line segment connecting points A2, A3) of the content 310. For example, the electronic device may identify a first distance between a center point of a portion of the content 310 in which the first subject is captured among the plurality of subjects and a center point of the content 310. In the example, the electronic device may identify a second distance between a central point of another portion of the content 310 in which the second subject is captured among the plurality of subjects and the central point of the content 310. For example, when the first distance is less than the second distance, the electronic device may set the rank of the first subject corresponding to the first distance to be higher than the rank of the second subject. The fact that the first distance is less than the second distance may mean that the first object is disposed close to a central point of the content 310 in the content 310, than the second subject.

According to an embodiment, the electronic device may identify sizes of portions in which a plurality of subjects are captured in the content 310. The electronic device may determine a sequence of the subjects based on a descending order of the identified sizes. For example, in case that the size of the first portion where the first subject is captured is larger than the size of the second portion where the second subject different from the first subject is captured among a plurality of subjects captured in the content 310, the electronic device may adjust the rank of the first subject to be higher than the rank of the second subject. The embodiment is not limited to the above example based on descending order, and for example, the electronic device may determine the sequence of the subjects based on the ascending order of the portions in which the plurality of subjects are captured in the content 310.

In an embodiment in which a plurality of subjects are captured in the content 310, when the sizes of the portions in which at least two subjects are captured in the content 310 match, the electronic device may adjust a rank of the at least two subjects based on the positions of the portions. For example, the electronic device may assign a higher rank to a subject captured within a specific portion among the portion, placed relatively close to the center point of the content 310 than to another subject captured within the other portion. In an embodiment in which a plurality of subjects are captured in the content 310, when the distances between the central point and the portions where at least two subjects are captured in the content 310 match, the electronic device may adjust the rank of the at least two subjects based on the sizes of the portions. For example, the electronic device may assign a higher priority to a subject captured in a specific portion having a relatively large size than other subjects captured in another portion among the portions.

According to an embodiment, the electronic device may obtain a sequence of the plurality of subjects based on a score allocated from the content 310 to each of the plurality of subjects. The score may be differentially allocated based on the category in which the subject is classified among the preset categories and/or the interaction between the subject and the user of the electronic device. The interaction may be related, for example, to whether the subject is registered in the contact information. According to an embodiment, the electronic device may obtain a sequence of the plurality of subjects based on a descending order of scores of the plurality of subjects.

According to an embodiment, the electronic device may selectively display the plurality of subjects in response to identifying a plurality of subjects within the content 310 based on areas 320, 330, and 340. For example, when a size and/or an area of the displaying area where the content 310 is displayed is reduced, the electronic device may expand an area in which at least one subject selected based on the sequence is captured among the plurality of subjects. Based on the expanded area, the electronic device may preferentially display the at least one subject in the reduced displaying area.

As described above, the reduction of the displaying area due to the transformation of the electronic device may reduce the visibility of content displayed in the displaying area. In order to compensate for the reduction in visibility of the content, the electronic device may expand the content in the reduced displaying area based on at least one of a plurality of subjects included in the content. The electronic device may determine at least one subject to be preferentially displayed in the reduced displaying area based on the sequence of the plurality of subjects. Hereinafter, referring to FIGS. 4A to 4E, according to an embodiment, an operation in which the electronic device expands the content based on at least one of a plurality of subjects will be described.

FIGS. 4A to 4E are exemplary views for describing an operation in which an electronic device displays a content based on one or more subjects captured in the content, according to an embodiment. The electronic devices of FIGS. 4A to 4E may be examples of the electronic devices 101 of FIGS. 1 and 2A to 2B, and/or the electronic devices of FIG. 3. For example, the screens 410, 420, 430, 440, and 450 of FIGS. 4A to 4E may be screens that the electronic device 101 of FIG. 1 displays in the displaying area of the display 140. Hereinafter, the screen may refer to a user interface (UI) displayed within at least a portion of the display. The screen may include, for example, activity of an Android operating system.

Referring to FIGS. 4A to 4E, in a state in which an application for browsing a plurality of contents is executed, different screens 410, 420, 430, 440, and 450 displayed by the electronic device in the displaying area of the display (e.g., the display 140 in FIG. 1) are illustrated. The screen 410 may be a screen for displaying a list of a plurality of contents stored in the memory (e.g., the memory 130 of FIG. 1) of the electronic device. For example, in the screen 410, the electronic device may display a visual object corresponding to any one of a plurality of contents, such as a thumbnail 412. In response to receiving an input selecting the thumbnail 412, the electronic device may switch from the screen 410 to any one of the screens 420, 430, 440, and 450. Hereinafter, it is assumed that the content 310 of FIG. 3 corresponds to the thumbnail 412. Based on a gesture of touching and/or clicking the thumbnail 412, the electronic device may receive a request for displaying content (e.g., content 310 of FIG. 3) corresponding to the thumbnail 412. The screens 420, 430, 440, and 450 of FIGS. 4B to 4E may be exemplary screens displayed by the electronic device in response to the request.

Figure 4A:
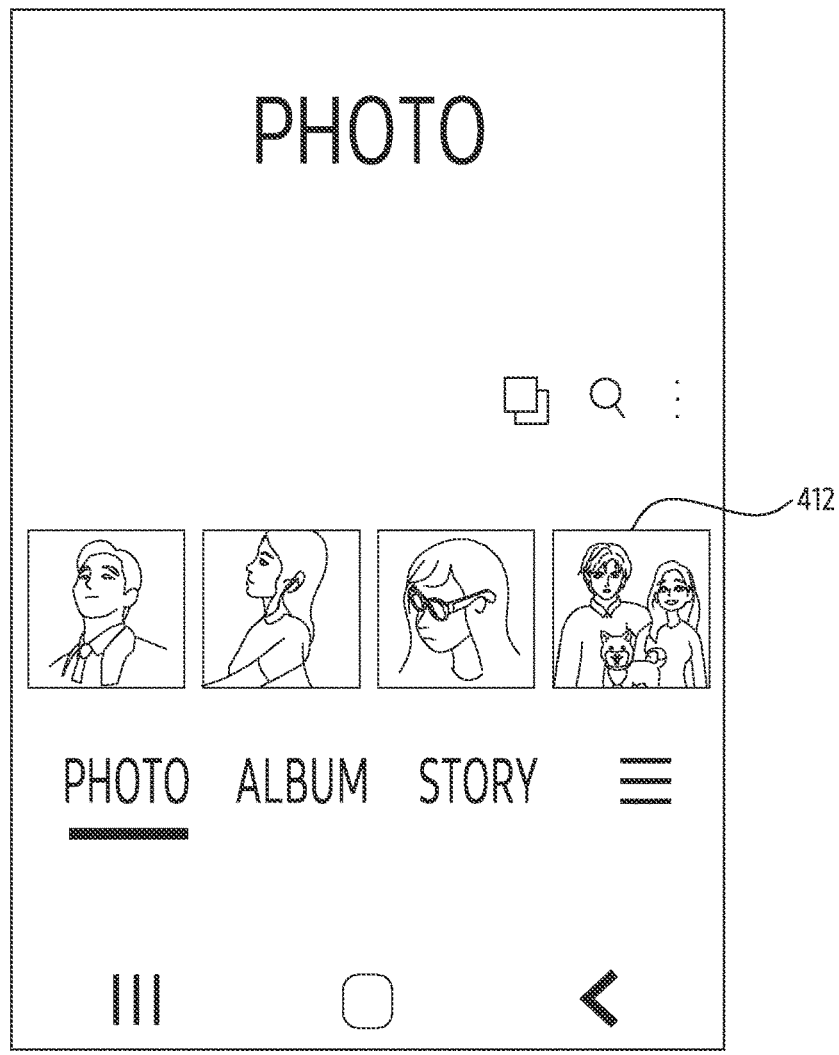
FIGS. 4A to 4E are exemplary views for describing an operation in which an electronic device displays a content based on one or more subjects captured in the content, according to an embodiment.
Figure 4B:
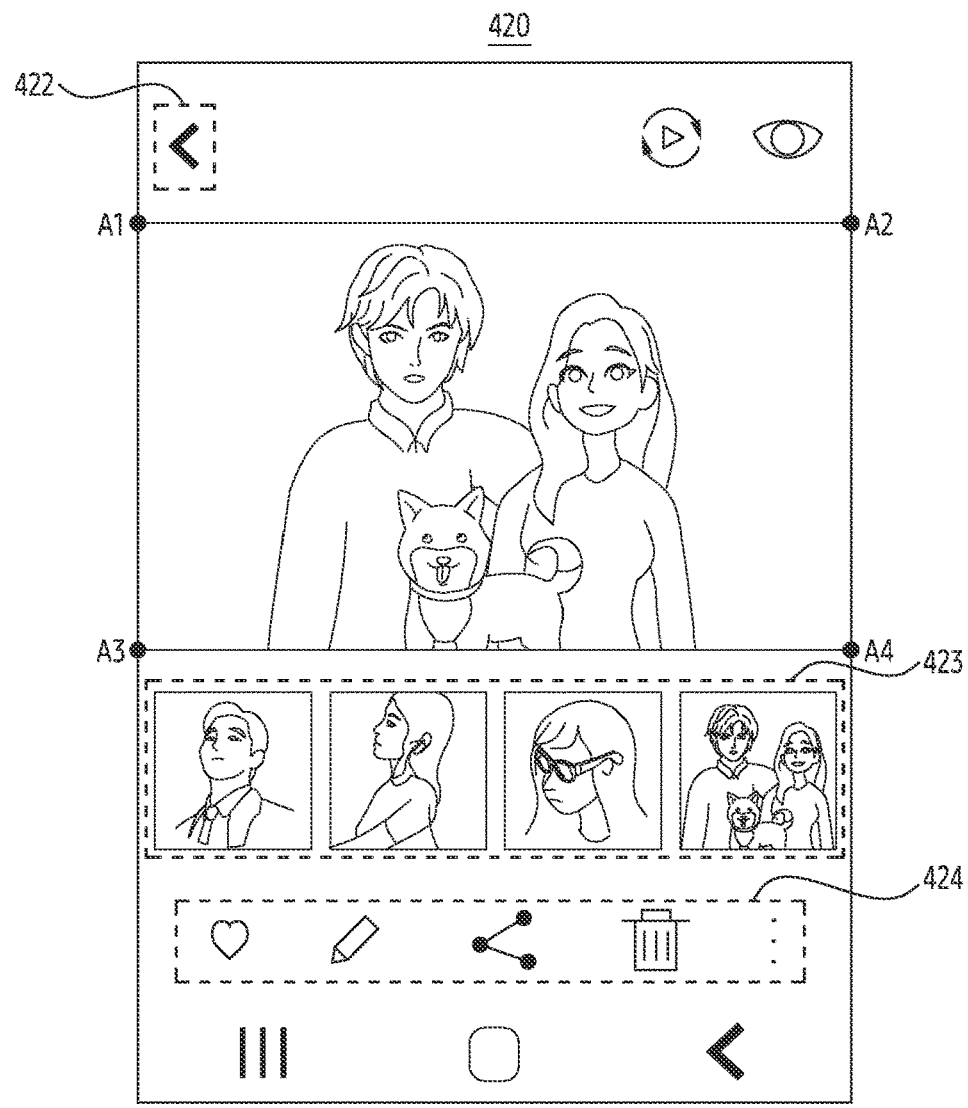

Referring to FIG. 4B, according to an embodiment, an exemplary screen 420 in which the electronic device displays content is illustrated. In the screen 420, the electronic device may display the entire pixels included in the content. In screen the 420, the electronic device may adjust the magnification of the content so that the width of the content corresponds to the width of the displaying area. For example, in screen the 420, the width of the content may be a numerical value corresponding to the width of the displaying area, or may have a numerical value reduced by a preset offset (or margin) from the width of the displaying area. Since the electronic device displays the entire pixels, corners A1, A2, A3, and A4 of the content 310 of FIG. 3 may be included in the screen 420. According to an embodiment, the electronic device may expand or reduce content based on a gesture (e.g., a pinch-to-zoom gesture) performed within the screen 420. The screens 430, 440, and 450 of FIGS. 4C to 4E may be an example of a screen displayed while expanding the content based on the gesture.

In the screen 420, the electronic device may display a visual object such as a button 422 for switching from the screen 420 to the screen 410. In the screen 420, the electronic device may display a visual object such as a thumbnail list 423 for displaying a list of a plurality of contents. Based on the input in the thumbnail list 423, the electronic device may replace the content displayed in the screen 420. In the portion 424 of the screen 420, the electronic device may display functions related to content displayed in the screen 420. For example, the functions may include at least one of a function of embedding a tag expressing feelings such as "like" in the content, a function of applying a visual effect to the content, A function of sharing the content with another application different from the application corresponding to the screen 420, or a function of removing the content.

According to an embodiment, the electronic device may expand, and display content based on the transformation of the electronic device. Expanding the content may be performed based on the size of the displaying area being changed by the electronic device transforming the display (e.g., the display 140 of FIG. 1). For example, when the display is inserted into the housing of the electronic device and the size of the displaying area is reduced, the electronic device may expand the content. For example, when the size of the portion where the content is displayed within the displaying area is reduced, such as screen segmentation based on multitasking and/or multi-window, the electronic device may expand and display content within the portion having the reduced size. According to an embodiment, an operation of expanding content by the electronic device based on a multi-window will be described later with reference to FIGS. 8A to 8D.

The electronic device according to an embodiment may include a foldable first display and a second display having a size smaller than the first display. The first display may be disposed across the first housing and the second housing connected to a folding housing including a folding shaft of the electronic device. The second display may be disposed on another surface of the first housing, which is faced away one surface of the first housing on which the first display is disposed. The electronic device may display content displayed in the first display in the second display based on an occlusion of the displaying area of the first display by the folding of the first display. In the example, the electronic device may expand the content in the second display while displaying the content in the second display having a size smaller than the first display. In an embodiment, the first display may be referred to as a flexible display, and the second display may be referred to as a cover display. According to an embodiment, the electronic device may expand the content based on one or more subjects captured in the content. According to an embodiment, the electronic device may obtain a sequence of a plurality of subjects in response to identifying a plurality of subjects from the content. The electronic device may selectively display a portion in which at least one of the plurality of subjects is captured in the displaying area based on the obtained sequence.

Figure 4C:
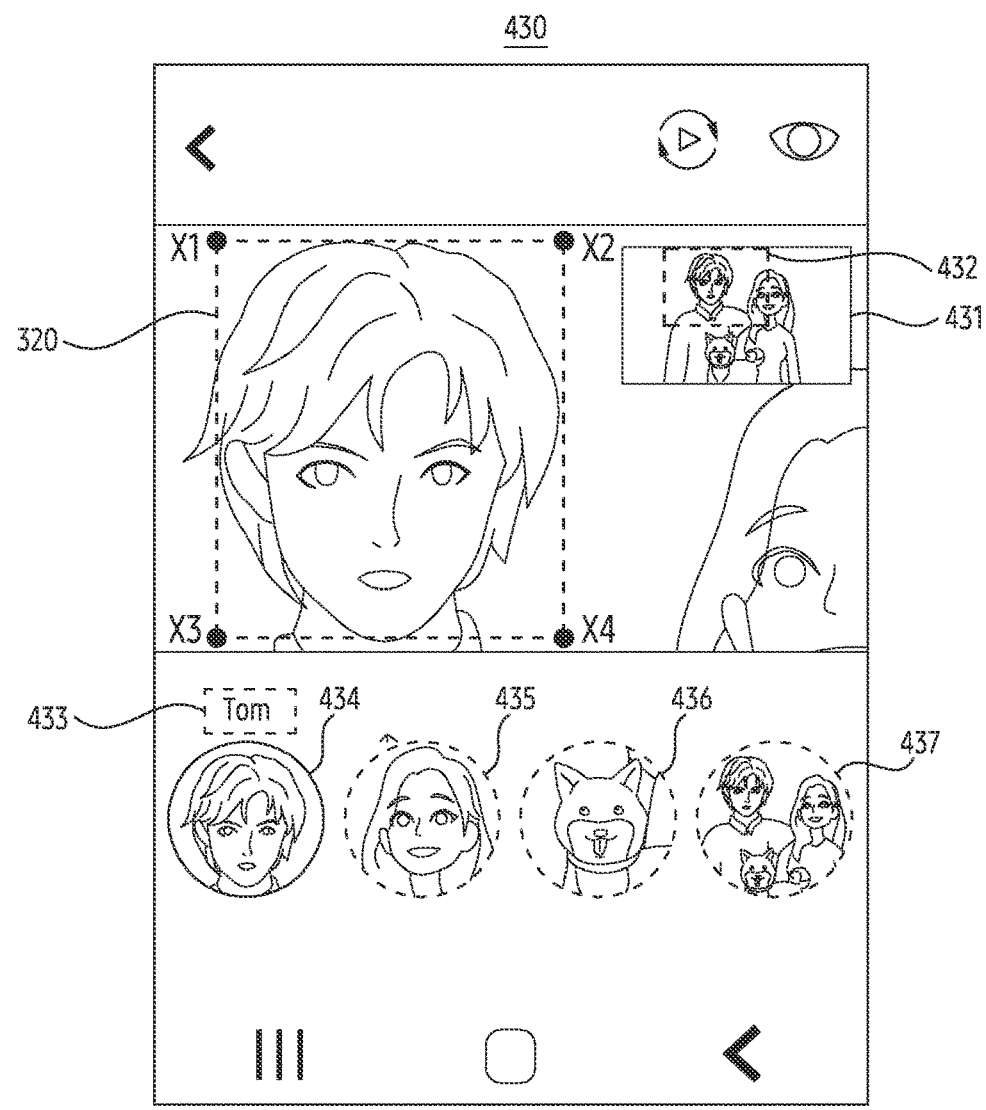

Referring to FIG. 4C, according to an embodiment, an exemplary screen 430 in which the electronic device selectively displays any one of a plurality of subjects captured in the content is illustrated. The electronic device may display the screen 430 in response to the reduction of the displaying area by the transformation of the display and/or the reduction of the area in which the content is displayed in the displaying area. The transformation of the display may include an insertion of the display into the housing of the electronic device described above with reference to FIGS. 2A to 2B. The reduction of the area in which the content is displayed may occur based on multi-window and/or screen division. The electronic device may select any one of a plurality of subjects based on a priority between the plurality of subjects. For example, the electronic device may obtain the priority based on the above-described operation with reference to FIG. 3.

The electronic device may expand the content so that the content area 320 is included in the displaying area in the screen 430. Based on the expansion of the content, the width of the area 320 may correspond to the width of the displaying area in the screen 430. For example, the width of the area 320 may be the width of the displaying area or a numerical value subtracted by a preset offset from the width of the displaying area. For example, the height of the area 320 may be the height of the displaying area or a numerical value subtracted by a preset offset from the height of the displaying area. Referring to FIG. 4C, corners A1, A2, A3, and A4 of the content 310 of FIG. 3 may be excluded from the displaying area, and corners X1, X2, X3, and X4 of the area 320 may be included in the screen 430 by the expansion of the content. The electronic device may display a subject corresponding to the area 320 in the displaying area based on the margin, padding, and/or offset adjacent to the corners X1, X2, X3, and X4 of the area 320.

The electronic device may display a visual object such as the thumbnail 431 of content in a preset portion of the screen 430 while a portion of the content (e.g., a portion of the content including the area 320) is selectively displayed by the expansion of the content. The electronic device may indicate a location of a portion of content displayed in the displaying area by using a visual object 432 superimposed on the thumbnail 431. In an embodiment, the visual object 432 may be referred to as a frame. In an embodiment, the thumbnail 431 and the visual object 432 superimposed on the thumbnail 431 may be referred to as a map view. For example, the corners of the visual object 432 may match each of the corners of a portion of the content displayed in the displaying area. According to an embodiment, the electronic device may modify a portion of content displayed in the displaying area based on an input shifting the visual object 432 in the thumbnail 431. According to an embodiment, the electronic device may switch to a state in which the entire content is displayed in the displaying area (e.g., a state corresponding to screen 420) based on identifying a tap-gesture for the thumbnail 431. When switching to a state in which the entire content is displayed, the electronic device may cease displaying the thumbnail 431 and the visual object 432.

According to an embodiment, the electronic device may display a plurality of visual objects 434, 435, and 436 corresponding to each of a plurality of subjects captured in the content. When the electronic device displays the content 310 of FIG. 3, each of the visual objects 434, 435, and 436 may include thumbnails based on each of the areas 320, 330, and 340 of FIG. 3. The sequence in which the electronic device displays visual objects 434, 435, and 436 in the screen 430 may be related to the sequence of subjects captured in the content. Referring to FIG. 4C, in a state in which the electronic device expands the first subject corresponding to the area 320, the electronic device may display, among the visual objects 434, 435, and 436, the visual object 434 corresponding to the first subject in preference to other visual objects 435 and 436, and sequentially display visual objects 435 and 436 based on a priority allocated to other subjects except the first subject. For example, a tag such as a name is assigned to the first subject corresponding to the area 320 among the subjects captured in the content 310 of FIG. 3, the electronic device may display, among the visual objects 434, 435, and 436 of FIG. 4C, the visual object 434 corresponding to the first subject in priority over other visual objects 435 and 436. For example, in the screen 430 of FIG. 4C, the electronic device may place the visual object 434 to the left of the other visual objects 435 and 436. In the example, the electronic device may display the tag allocated to the first subject adjacent to the visual object 434, like the visual object 433.

According to an embodiment, the electronic device may display a visual object 437 corresponding to a portion of the content including the entire subjects included in the content, together with the visual objects 434, 435, and 436. In a state in which the content is expanded based on the first subject among the subjects included in the content, the electronic device may emphasize the visual object 434 corresponding to the first subject among the visual objects 434, 435, 436, and 437 more than the other visual objects 435, 436, and 437. Referring to FIG. 4C, the electronic device may display a boundary line of the visual object 434 as a solid line, and boundary lines of the visual objects 435, 436, and 437 as dashed lines. For example, the electronic device may display the first color of the boundary line of the visual object 434 in a color different from the second color of the boundary lines of the visual objects 435, 436, and 437. In the above example, the second color may be white, and the first color may be yellow. The embodiments are not limited thereto, and for example, the electronic device may at least temporarily cease displaying the visual object 434 corresponding to the first subject expanded by the screen 430 among the visual objects 434, 435, 436, and 437. In the above example in which the electronic device ceases displaying the visual object 434, the electronic device may resume display of the visual object 434 in response to an input that selects one of the visual objects 435, 436, 437, and/or an input that adjusts the magnification of content in the screen 430.

According to an embodiment, the electronic device may receive an input selecting a visual object from among visual objects 433, 434, 435, 436, and 437. In response to the received input, the electronic device may expand the content based on a subject of the content corresponding to the selected visual object. For example, in response to receiving an input selecting the visual object 435 among the visual objects 433, 434, 435, 436, and 437, the electronic device may switch from the screen 430 of FIG. 4C to the screen 440 of FIG. 4D. For example, in response to receiving an input selecting the visual object 437 among the visual objects 433, 434, 435, 436, and 437, the electronic device may switch from the screen 430 of FIG. 4C to the screen 450 of FIG. 4E.

Figure 4D:
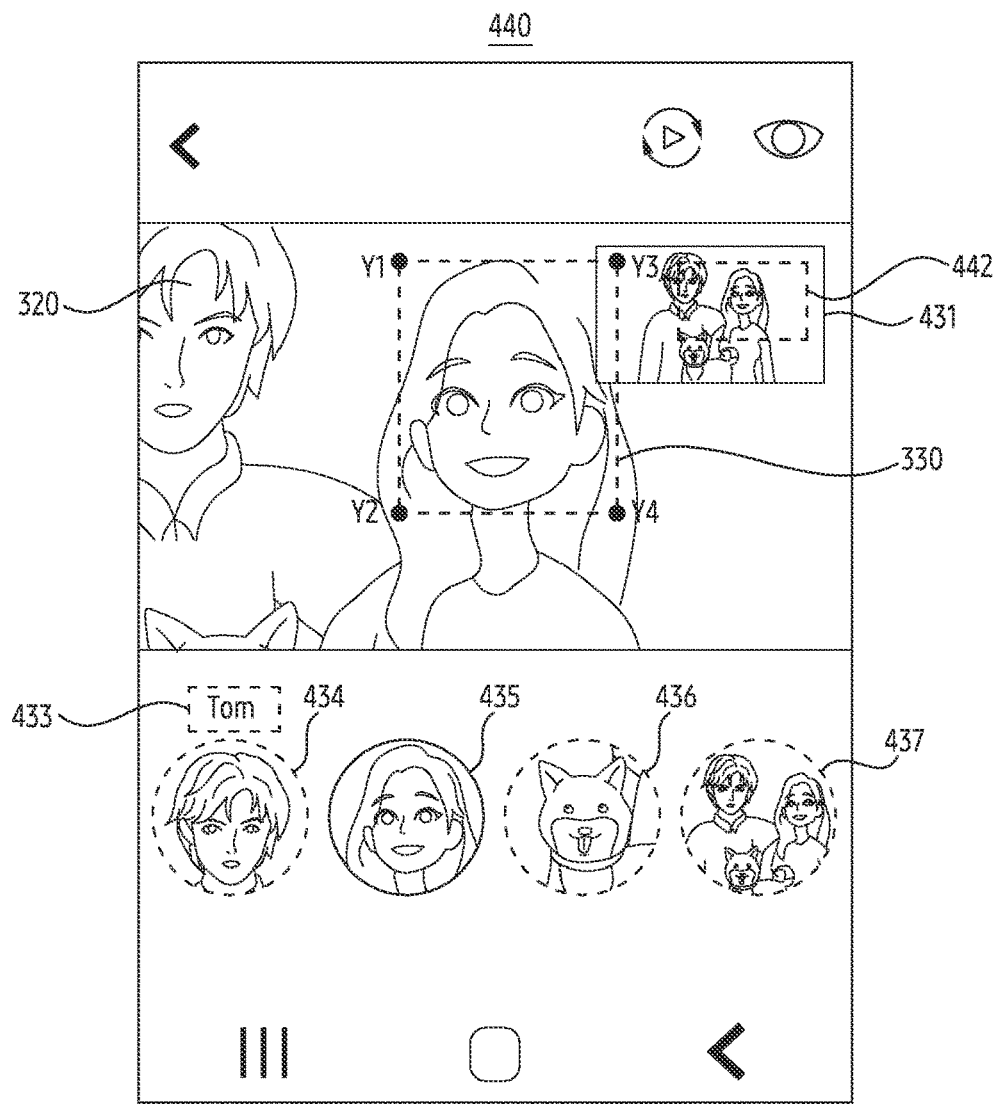

According to an embodiment, the screen 440 of FIG. 4D may be displayed by an electronic device that receives an input selecting the visual object 435. Referring to the screen 430 of FIG. 4C and the screen 440 of FIG. 4D, the electronic device may change the visual object 435 based on the input to emphasize the visual object 435 among the visual objects 434, 435, 436, and 437 more than other visual objects 434, 436, and 437. For example, the electronic device may replace the borderline of the visual object 435 with a straight line from the dashed line. The electronic device may change the borderline of the visual object 434 from the straight line to the dashed line to cease emphasizing the visual object 434. In the screen 440, the electronic device may display a portion of the content including the content area 330 corresponding to the visual object 435. Referring to FIG. 4D, corners Y1, Y2, Y3, and Y4 of the area 330 may be included in the screen 440. In order to display a portion of the content including the area 330, at least one of the corners (e.g., the corners A1, A2, A3, and A4 of FIG. 3 and/or FIG. 4B) may be excluded from the screen 440. While the visual object 435 is selected, the electronic device may display a portion of content in which the area 330 corresponding to the visual object 435 is the center in the screen 440.

Referring to FIG. 4D, while the portion of the content centered on the area 330 is displayed, another portion of the content different from the portion may be excluded from the screen 440. According to an embodiment, the electronic device may indicate a portion of the content displayed in the screen 440 and the other portion by adjusting a position and/or a size of the visual object 442 displayed on the thumbnail 431. As described above with reference to FIG. 4C, according to an embodiment, the electronic device may modify a portion of content displayed in the screen 440 based on the movement of the visual object 442. According to an embodiment, the electronic device may modify a portion of content displayed in the screen 440 based on a gesture (e.g., a pinch-to-zoom gesture) performed in the screen 440.

Figure 4E:
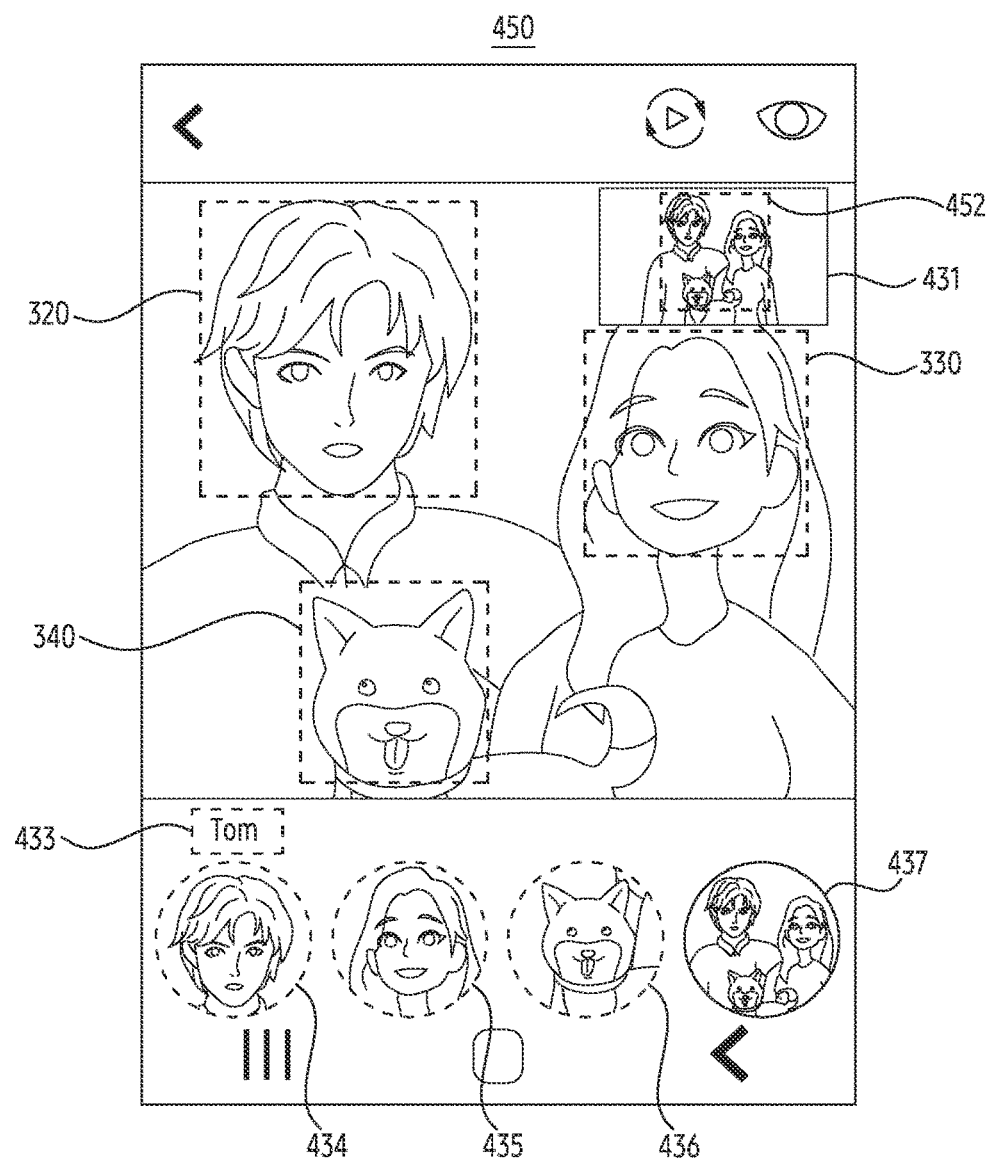

Referring to the screen 450 of FIG. 4E, according to an embodiment, the electronic device may display a portion of the content including areas 320, 330, and 340 in the content in which the subjects are captured. In the screen 450, the electronic device may identify a minimum portion including all of the areas 320, 330, and 340 based on positions of the areas 320, 330, and 340 in the content. In the screen 450, the electronic device may expand the content so that the minimum portion is included in the displaying area. The electronic device may indicate the position and size of the minimum portion displayed in the screen 450 in the content using the visual object 452 superimposed on the thumbnail 431.

According to an embodiment, the electronic device may perform switching from the screen 420 for including all the corners A1, A2, A3, and A4 of the content and displaying all the pixels of the content to any one of the screens 430, 440, and 450 based on the size of the displaying area. For example, when the size of the displaying area is reduced based on the transformation of the display (e.g., the actuator 150 in FIG. 1) based on the actuator (e.g., the display 140 in FIG. 1), the electronic device may switch to any one of the screens 430, 440, and 450. According to an embodiment, the electronic device may switch to any one of the screens 430, 440, and 450 based on the sequence of a plurality of subjects included in the content.

According to an embodiment, based on the operation described above with reference to FIG. 3, the electronic device may obtain a sequence of a plurality of subjects. The electronic device may selectively switch to any one of the screens 430, 440, and 450 so that at least one subject selected by the sequence is expanded in the displaying area. For example, the electronic device may switch from the screen 420 to the screen 430 based on the reduction of the displaying area so that the first subject assigned a tag such as a visual object 433 is expanded. In case that the plurality of subjects have a matching score or that a sequence of the plurality of subjects is not obtained, the electronic device may switch from the screen 420 to the screen 450 for displaying the entire subjects based on the reduction of the displaying area. In other words, in case that the plurality of subjects have a matching score or that a sequence of the plurality of subjects is not obtained, the electronic device may expand at least one subject disposed at the center point of content among the subjects, or a portion of the subjects captured closest to the center point based on the reduction of the displaying area.

As described above, according to an embodiment, the electronic device may support switching between screens 430, 440, and 450 suitable for displaying at least one of the one or more subjects captured in the content as well as the screen 420 for displaying the entire content. The electronic device may switch between the screens 420, 430, 440, and 450 based on a change in the displaying area by transforming the electronic device and/or the display. For example, when the displaying area is reduced, the electronic device may switch from the screen 420 to any one of the screens 430, 440, and 450 suitable for displaying at least one of the subjects. In the above example, when the displaying area is expanded, the electronic device may switch to the screen 420 for displaying the entire content.

Hereinafter, referring to FIG. 5, an operation of the electronic device switching between the screens 420, 430, 440, and 450 based on expansion or reduction of the displaying area will be described.

Figure 5:
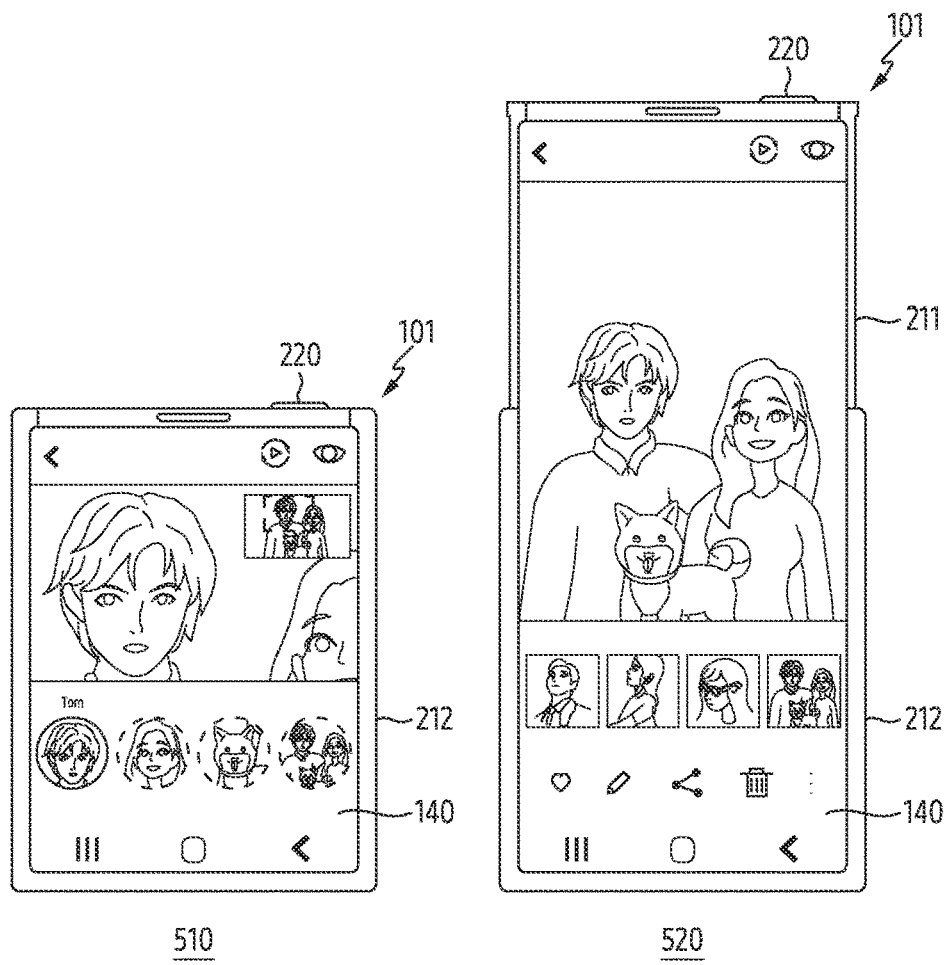
FIG. 5 is a diagram for describing an operation in which an electronic device displays a content based on a transformation of a display, according to an embodiment.

FIG. 5 is a diagram for describing an operation in which an electronic device 101 displays a content based on a transformation of a display 140, according to an embodiment. The electronic device of FIG. 5 may be an example of the electronic device 101 of FIGS. 1 and 2A to 2B and/or the electronic device of FIGS. 3 and 4A to 4E. For example, the electronic device 101 and the display 140 of FIG. 1 may include the electronic device 101 and the display 140 of FIG. 5. Although the operation based on the electronic device 101 including the connection of the first housing 211 and the second housing 212 in FIG. 2A is described, the electronic device 101 including the connection of the first housing 211 and the second housing 212 in FIG. 2B may operate similarly.

Referring to FIG. 5, states 510 and 520 included in each of a roll-in state and a roll-out state of the electronic device 101 are illustrated. According to an embodiment, in a state in which the screen 410 of FIG. 4A is displayed, the electronic device 101 may switch to any one of the states 510 and 520 of FIG. 5 in response to receiving input touching and/or clicking the thumbnail 412 of FIG. 4A. The states 510 and 520 of FIG. 5 may be in a portrait mode in which the electronic device 101 places one or more visual objects in the screen along the height direction of the display 140. Referring to the state 520 of FIG. 5, the electronic device 101 may display the entire pixels in the content like the screen 420 of FIG. 4B in response to receiving a request for displaying content in the roll-out state, such as the above input. Referring to the state 510 of FIG. 5, the electronic device 101 may expand a portion in which at least one subject captured in the content is captured, such as the screen 430 of FIG. 4C, in response to receiving a request for displaying content like the input above, in the roll-in state.

According to an embodiment, the electronic device 101 may receive an input for transforming the display 140 while displaying the entire pixels in the content, such as state 520. In response to receiving the input within the roll-out state such as state 520, the electronic device 101 may insert the display 140 into the second housing 212 to reduce the displaying area. Based on the reduction of the displaying area, the electronic device 101 may switch from the state 520 to the state 510. During the transformation from the state 520 to the state 510, The electronic device 101 may selectively display a portion in which at least one subject is captured among a plurality of subjects captured in the content in the reduced displaying area. Other portions different from the portion in the content may be excluded from the displaying area based on the selective display of the portion.

According to an embodiment, the electronic device 101 may receive an input for transforming the display 140 while expanding a portion of the content, such as the state 510. In response to receiving the input within a roll-in state such as state 510, the electronic device 101 may extract the display 140 from the second housing 212 to expand the displaying area. Based on the expansion of the displaying area, the electronic device 101 may switch from the state 510 to the state 520. During the transformation from the state 510 to the state 520, the electronic device 101 may display the entire pixels in the content in the expanded displaying area.

As described above, according to an embodiment, the electronic device 101 may adjust a magnification of content based on the transformation of the display 140. When the size of the displaying area is reduced by the transformation of the display 140, the electronic device 101 may expand a portion in which one or more subjects are captured in the content within the reduced displaying area. Since the portion is expanded, other portion in which the one or more subjects are not captured in the reduced displaying area may be excluded. Since the other portion is excluded from the reduced displaying area, the electronic device 101 may improve visibility of one or more subjects despite reduction of the displaying area.

Hereinafter, referring to FIGS. 6A to 6B, according to an embodiment, an operation of the electronic device 101 in a case in which the electronic device 101 does not identify any subject from the content will be described.

Figure 6A:
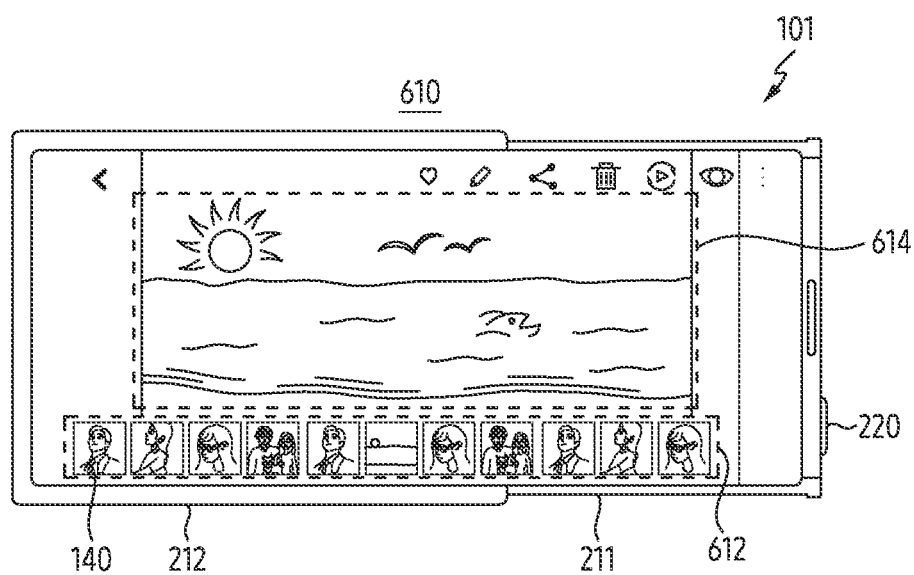
FIG. 6A to FIG. 6B are views for describing an operation in which an electronic device displays a content that does not include a subject of preset types, according to an embodiment.
Figure 6B:
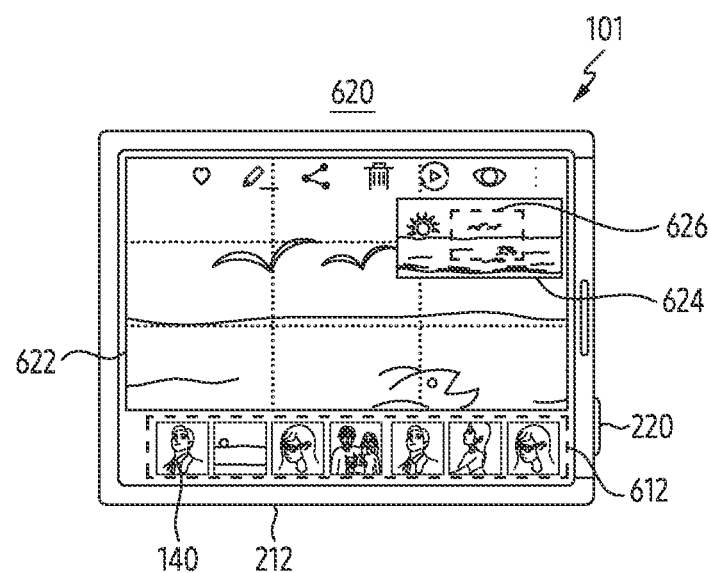

FIG. 6A to FIG. 6B are views for describing an operation in which an electronic device 101 displays a content that does not include a subject of preset types, according to an embodiment. The electronic device 101 of FIGS. 6A to 6B may be an example of the electronic device 101 of FIGS. 1 to 5. For example, the electronic device 101 and the display 140 of FIG. 1 may include the electronic device 101 and the display 140 of FIG. 5.

Referring to FIGS. 6A to 6B, according to an embodiment, different states 610 and 620 in which the electronic device 101 expands or reduces and displays content based on a size of the displaying area are illustrated. The states 610 and 620 of FIGS. 6A to 6B may be in a landscape mode in which the electronic device 101 places one or more visual objects in the screen along the width direction of the display 140. In the state 610 of FIG. 6A, the electronic device 101 may have a roll-out state. In the state 610 of FIG. 6A, the electronic device 101 may display the entire content in the portion 614 of the displaying area. In the state 610 of FIG. 6A, the electronic device 101 may operate similarly to the state 520 of FIG. 5 and/or the screen 420 of FIG. 4B. For example, in the state 610, similar to the thumbnail list 423 of FIG. 4B, the electronic device 101 may display a thumbnail list 612 displaying exploring a plurality of contents stored in the electronic device 101.

While displaying the entire pixels included in the content, as shown in state 610, the electronic device 101 may change a magnification of the content based on an aspect ratio of the displaying area and an aspect ratio of the content. For example, an electronic device may display content based on a magnification that makes the width of the content less than the width of the displaying area and the height of the content less than the height of the displaying area. In the state 610, the electronic device 101 may adjust the magnification of the content displayed in the portion 614 based on the gesture performed on the display 140.

According to an embodiment, the electronic device 101 may switch from the state 610 of FIG. 6A to the state 620 of FIG. 6B based on the transformation of the electronic device 101 and/or the display 140. For example, the electronic device 101 may switch to the state 620 in response to an input pressing the button 220 in the state 610. Referring to FIG. 6B, according to an embodiment, the electronic device 101 may expand content based on transforming from the roll-out state to the roll-in state. Based on the expansion of the content, the electronic device 101 may maintain visibility of the content independently of the reduction of the displaying area by transforming.

According to an embodiment, the electronic device 101 may expand the content based on a result of identifying a subject from the content. In the case of identifying one or more subjects from the content, the electronic device 101 may expand a portion of the content in which the one or more subjects are captured. When one or more subjects may not be identified from the content, the electronic device 101 may expand the content based on the composition of the content. Failure to identify one or more subjects from the content may mean, for example, that the content does not include subjects corresponding to preset categories, or that the user does not assign any tags to the content.

According to an embodiment, the electronic device 101 may expand content within the displaying area portion 622 in the state 620. The electronic device 101 may display a thumbnail 624 indicating the entire content in the displaying area and a visual object 626 of a quadrangle superimposed on the thumbnail 624 to indicate a portion of the content displayed in the displaying area in portion 622. Based on an input dragging the visual object 626 within the thumbnail 624, the electronic device 101 may change a portion of the content displayed in the portion 622 to another portion of the content matching the input. For example, based on the reception of a tap-gesture for the thumbnail 624, the electronic device 101 may switch to a state in which the entire content is displayed, such as the screen 420 of FIG. 4B and/or the state 610 of FIG. 6A.

According to an embodiment, the electronic device 101 may expand the content based on the composition of the content in the state 620. The electronic device 101 may expand the content based on a preset ratio of 1:1.618 in the portion 622. Referring to FIG. 6B, the electronic device 101 may expand the content so that a horizontal line included in the content is disposed on the preset ratio within the portion 622.

As described above, according to an embodiment, the electronic device 101 may expand or reduce the content in the state of displaying content that does not include a subject, based on the expansion or reduction of the displaying area by the transformation of the electronic device 101 and/or the display 140. In the state, the electronic device 101 may expand a portion of the content based on the composition of the content.

Hereinafter, referring to FIGS. 7A to 7B, according to an embodiment, an operation performed by the electronic device 101 based on subjects captured at different locations within the frames of the video while playing back the video included in the content will be described.

Figure 7A:
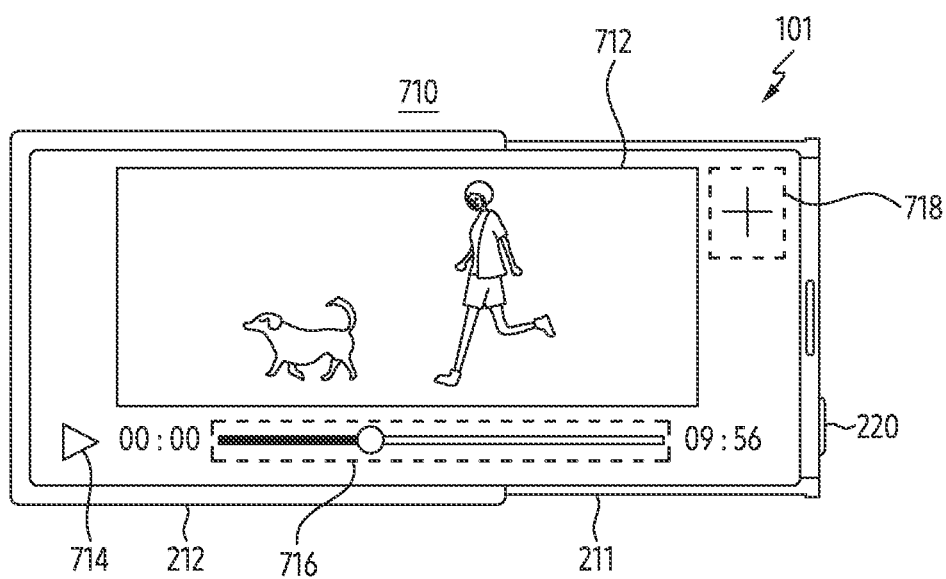
FIGS. 7A to 7B are exemplary diagrams for describing an operation in which an electronic device displays a content based on one or more subjects captured in the content including a video, according to an embodiment.
Figure 7B:
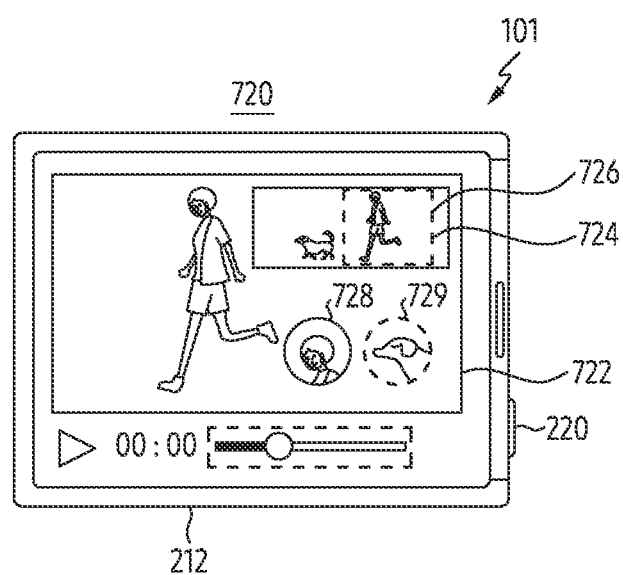

FIGS. 7A to 7B are exemplary diagrams for describing an operation in which an electronic device 101 displays a content based on one or more subjects captured in the content including a video, according to an embodiment. The electronic device 101 of FIGS. 7A to 7B may be an example of the electronic device 101 of FIGS. 1 to 5 and/or 6A to 6B. For example, the electronic device 101 of FIG. 1 and the display 140 may include the electronic device 101 of FIGS. 7A to 7B and the display 140.

According to an embodiment, the electronic device 101 may playback a video included in the content. The content including the video may be selected within the list of a plurality of contents stored in the electronic device 101 such as the screen 410 of FIG. 4A. When the content including the video is selected within the list, the electronic device 101 may playback the video included in the selected content, as shown in the states 710 and 720 of FIGS. 7A to 7B. For example, the electronic device 101 may sequentially display a plurality of frames included in the video in the displaying area of the display 140 and output audio included in the content and synchronized in a time domain with the video at the same time. For example, the electronic device 101 may output the audio by one or more speakers included in the electronic device 101 and/or one or more speakers included in an external electronic device different from the electronic device 101. Hereinafter, an operation of the electronic device 101 playing back the video included in the content based on the landscape mode is described, but the embodiment is not limited thereto.

Referring to the state 710 of FIG. 7A, the electronic device 101 may display the entire pixel included in one frame of the video in the content within the displaying area 712 in the roll-out state. For example, the corners of the portion 712 may match the corners of the frame. According to an embodiment, the electronic device 101 may display a button 714 for controlling the playback of the video, and/or the content, together with the portion 712. Based on the tap-gesture for the button 714, the electronic device 101 may playback the video or at least temporarily cease the playback of the video. According to an embodiment, the electronic device 101 may display a visual object such as a timeline 716 visually indicating when a frame played back in the displaying area corresponds to the entire time period of the video together with the portion 712.

According to an embodiment, the electronic device 101 may display a button 718 for expanding content in the state 710. In response to an input selecting the button 718, the electronic device 101 may expand the content. Meanwhile, in response to an input for transformation of the electronic device 101 and/or the display 140, the electronic device 101 may transform from a roll-out state to a roll-in state. Referring to FIG. 7B, the state 720 may be a state of the electronic device 101 after switching to the roll-in state in response to an input for transformation of the display 140.

Referring to FIG. 7B, in the state 720, the electronic device 101 may expand a portion in which at least one of a plurality of subjects captured in the video of the content is captured. Referring to FIG. 7B, an exemplary state 720 in which a subject corresponding to a person is expanded and captured within one frame of the video is illustrated. The electronic device 101 may identify one or more subjects from the one frame based on the above-described operation with reference to FIG. 3. The electronic device 101 may expand a portion in which the subject is captured in the portion 722 of the displaying area, and display a thumbnail 724 corresponding to the entire one frame and a visual object 726 superimposed on the thumbnail 724 to indicate the position of the expanded portion.

According to an embodiment, while the electronic device 101 sequentially plays back frames included in the video of the content within the state 720, a subject may be captured within different positions within the frames. While displaying the frames sequentially, the electronic device 101 may expand each of the frames in the portion 722 based on the different position of the subject in each of the frames.

According to an embodiment, the electronic device 101 may display visual objects 728, and 729 corresponding to each of the subjects captured in the frame, together with the portion 722, in the state 720. The electronic device 101 may display thumbnails of the subjects on the visual objects 728 and 729. In response to an input selecting any one of the visual objects 728, 729, the electronic device 101 may expand a portion of content corresponding to the selected visual object.

As described above, according to an embodiment, the electronic device 101 may preferentially display the plurality of subjects by enlarging a portion in which at least one of a plurality of subjects included in the content is captured, within the reduced displaying area. Since the electronic device 101 preferentially displays the plurality of subjects, although the displaying area is reduced, visibility of the plurality of subjects may be improved.

FIGS. 8A to 8D are diagrams for describing an operation in which an electronic device 101 displays a content based on a transformation of the screen of the application for browsing the content, according to an embodiment. The electronic device 101 of FIGS. 8A to 8D may be an example of the electronic device 101 of FIGS. 1 to 5, 6A to 6B, and/or FIGS. 7A to 7B. For example, the electronic device 101 of FIG. 1 and the display 140 may include the electronic device 101 of FIGS. 8A to 8D and the display 140.

Figure 8A:
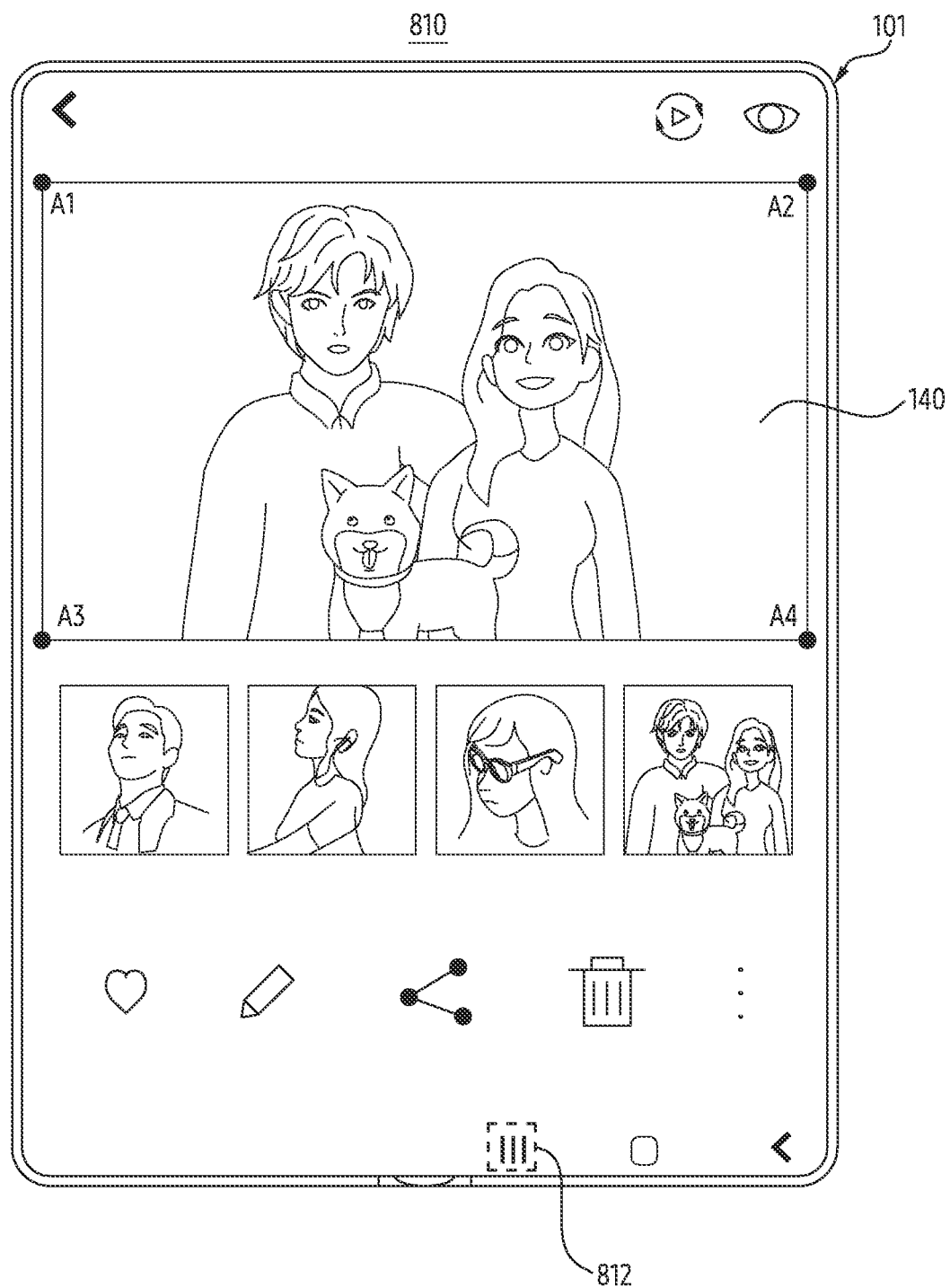
FIGS. 8A to 8D are diagrams for describing an operation in which an electronic device displays a content based on a transformation of the screen of the application for browsing the content, according to an embodiment.

According to an embodiment, the electronic device 101 may display a screen in the display 140 based on execution of an application for browsing content. In the state 810 of FIG. 8A, the electronic device 101 may display a screen based on the execution of the application on the entire displaying area of the display 140. The screen displayed in the state 810 may include the screen 420 of FIG. 4B. In the screen 420, the electronic device 101 may display the entire pixels included in the content. Referring to FIG. 8A, corners A1, A2, A3, and A4 of the content may be included in the display 140.

According to an embodiment, the electronic device 101 may display a visual object 812 for switching an application executed by the electronic device 101 in the display 140. In the state 810 of FIG. 8A, based on an input of touching and/or clicking the visual object 812, the electronic device 101 may switch from the state 810 of FIG. 8A to the state 820 of FIG. 8B.

Figure 8B:
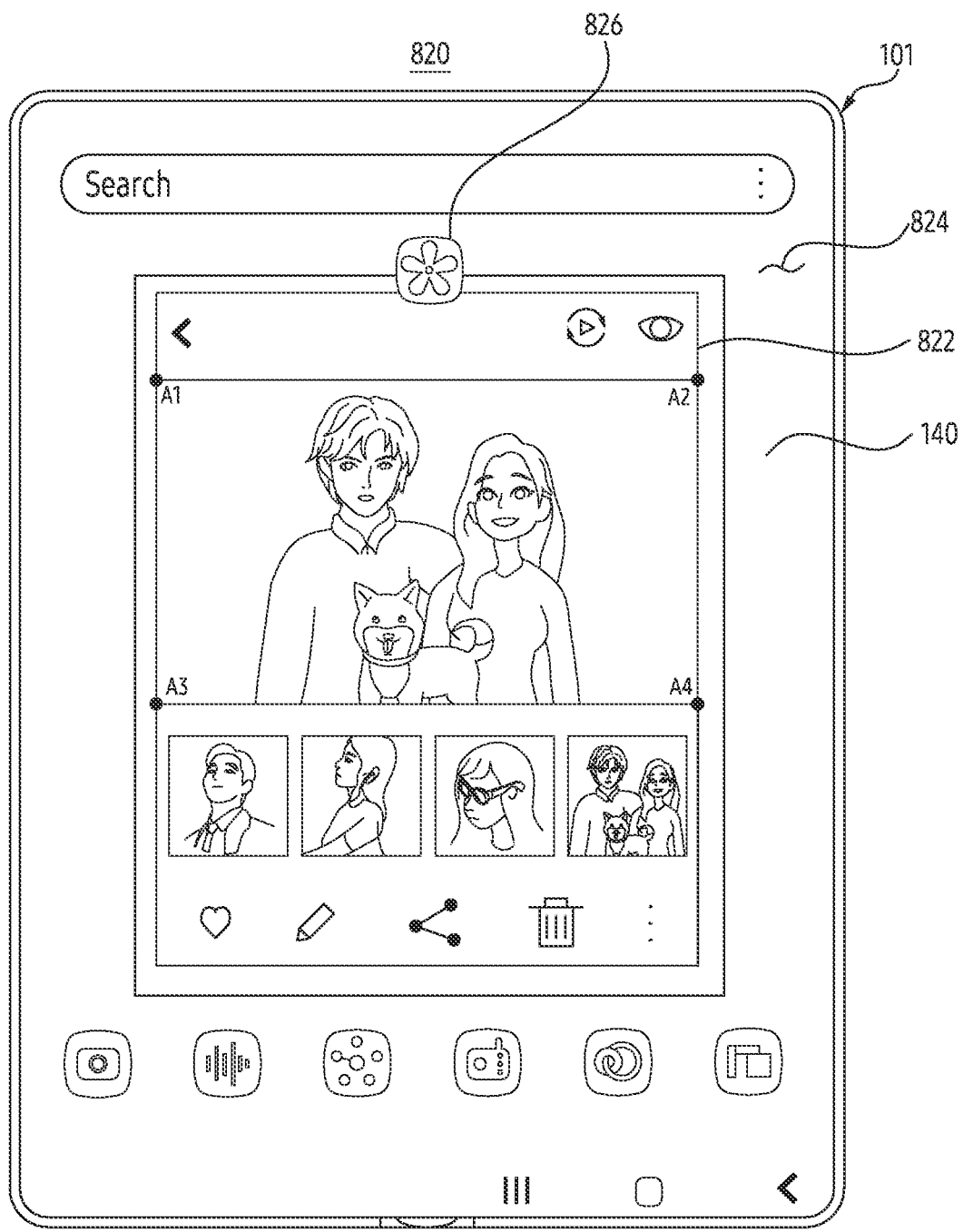

Referring to FIG. 8B, in the state 820, according to an embodiment, the electronic device 101 may display a screen 822 of an application executed by the electronic device 101 in the state 810 before entering the state 820 on the display 140. The electronic device 101 may display a screen 822 in a portion of the displaying area of the display 140. In other portions except for a portion of the display 140 on which the screen 822 is displayed, the electronic device 101 may display a screen 824 based on other applications (e.g., launcher applications such as home applications) different from the application. According to an embodiment, the electronic device 101 may display a visual object 826 for controlling execution of the application corresponding to the screen 822 in the state 820. In an embodiment of FIG. 8B, the electronic device 101 may superimpose and display a visual object 826 including an icon of the application on the screen 826.

Figure 8C:
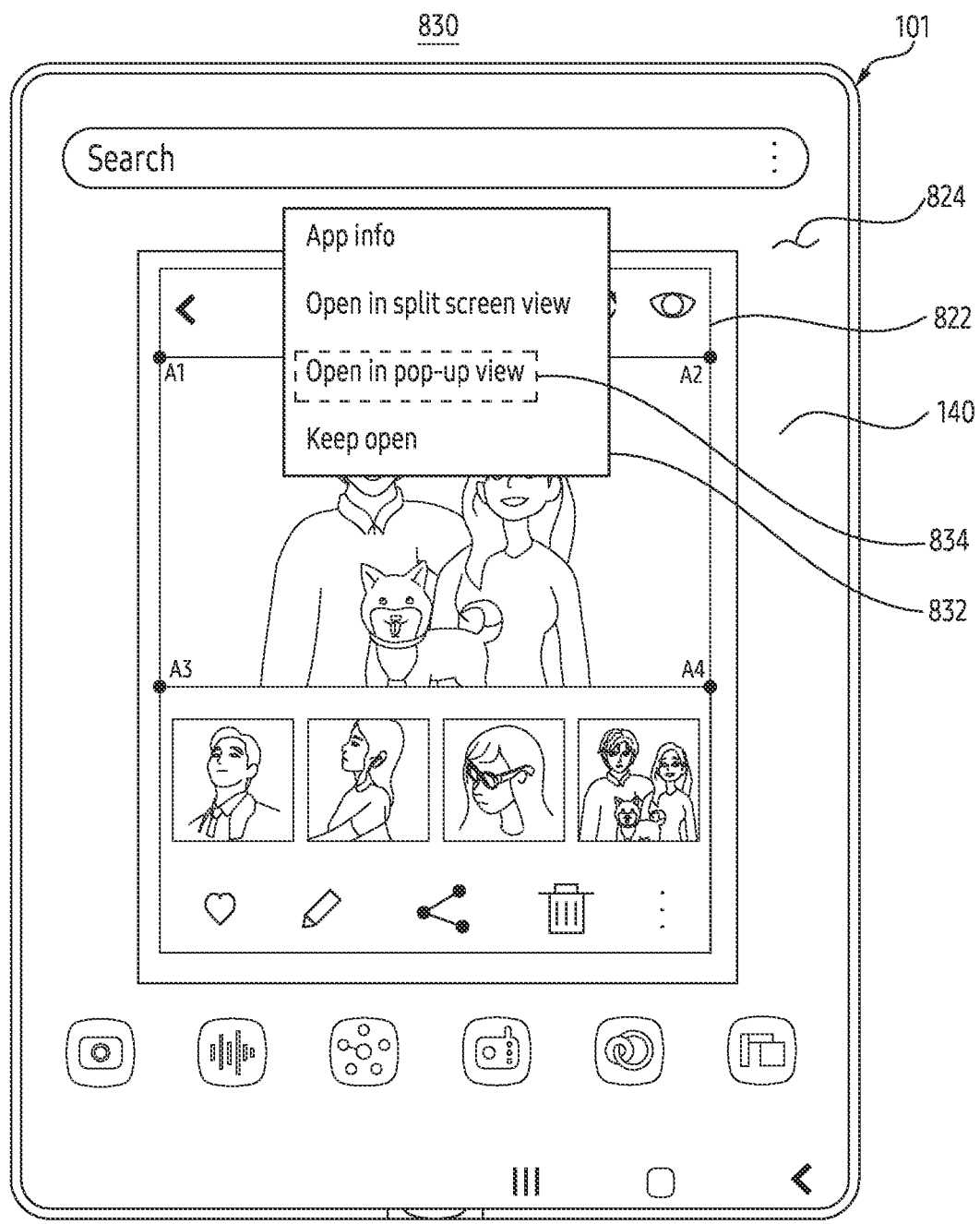

Based on the input of touching and/or clicking the visual object 826, the electronic device 101 may switch from the state 820 of FIG. 8B to the state 830 of FIG. 8C for receiving an input for controlling the execution of an application corresponding to the visual object 826. Referring to FIG. 8C, in the state 830, the electronic device 101 may display a menu 832 for controlling execution of the application corresponding to the screen 822 on the display 140. Referring to FIG. 8C, the menu 832 may be displayed superimposed on the visual object 826 of FIG. 8B.

According to an embodiment, the electronic device 101 may display selectable options related to the screen 822 and/or the application corresponding to the menu 832 within the menu 832 based on different texts and/or icons in the menu 832. Referring to FIG. 8C, the electronic device 101 may display at least one of a preset text (e.g., "App info") indicating a first option for displaying information of the application, a preset text (e.g., "Open in split screen window") indicating a second option for displaying screen 822 based on a grid shape dividing the displaying area of the display 140, a preset text (e.g., "Open in pop-up view") indicating a third option for displaying the screen 822 based on the pop-up window shape on the displaying area, and a preset text (e.g., "Keep open") indicating a fourth option for maintaining the display of the screen 832.

Referring to FIG. 8C, according to an embodiment, the electronic device 101 may receive an input touching and/or clicking a portion 834 of the menu 832 within the state 830. The portion 834 may include preset text (e.g., "Open in pop-up view") indicating a third option for displaying the screen 822 based on the pop-up window shape on the displaying area. Based on the reception of the input related to the portion 834, the electronic device 101 may switch from the state 830 of FIG. 8C to the state 840 of FIG. 8D.

Figure 8D:
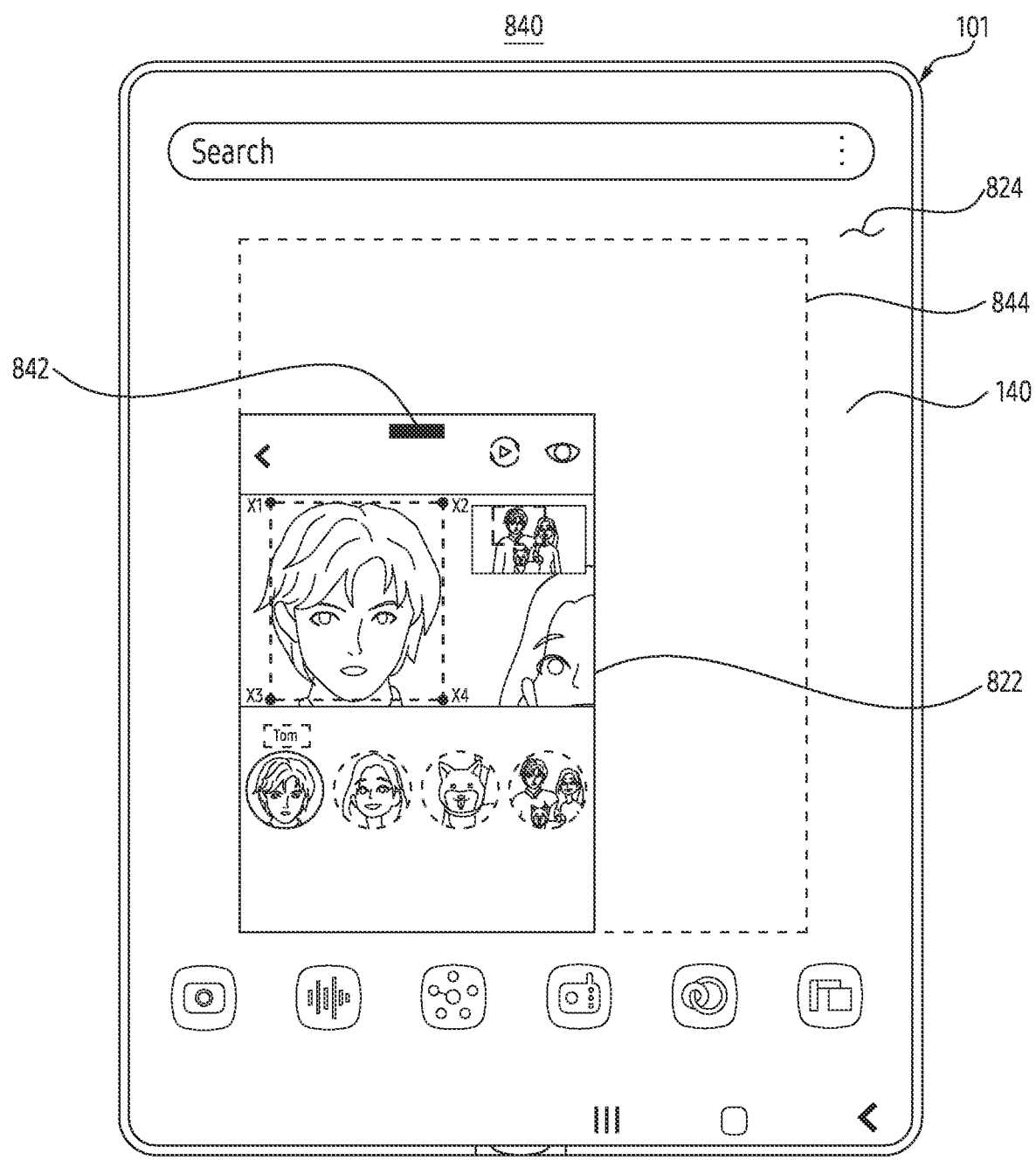

Referring to FIG. 8D, in the state 840, according to an embodiment, the electronic device 101 may reduce and display the screen 822 of the application running in the state 810 of FIG. 8A in the display 140. While displaying the screen 822 within a portion of the display 140, the electronic device 101 may display a visual object 842, such as a handle, for adjusting a position in the display 140 of the screen 822. Based on an input dragging the visual object 842, the electronic device 101 may move the screen 822 in the display 140 in parallel. According to an embodiment, the electronic device 101 may adjust a size of the screen 822 based on an input dragging the borderline of the screen 822. Referring to FIG. 8D, while receiving the input dragging the borderline, the electronic device 101 may inform the size of the screen 822 to be adjusted by the input based on the visual object 844 based on the shape of the quadrangle.

Based on the size of the screen 822 being reduced to less than the displaying area of the display 140, the electronic device 101 may display a portion of the content independently of displaying all pixels included in the content in the screen 822. Referring to FIG. 8D, in the state 840, the electronic device 101 may expand and display the content in the screen 822 such as the screen 430 of FIG. 4C. Since the content is expanded in the screen 822, the display of the corners A1, A2, A3, and A4 of the content may be ceased in the state 840. According to an embodiment, the electronic device 101 may expand the content in the screen 822 to selectively display at least one of a plurality of subjects captured in the content. Referring to FIG. 8D, the electronic device 101 may display the corners X1, X2, X3, and X4 among the corners X1, X2, X3, and X4 of the area in which one subject is captured, among the corners A1, A2, A3, and A4 or a plurality of subjects captured in the content, within the screen 822. According to an embodiment, the operation of the electronic device 101 identifying the plurality of subjects in the content may be performed based on the operation described above with reference to FIG. 3.

While displaying content based on the screen 822 occupying a portion of the displaying area of the display 140 as shown in the state 840 of FIG. 8D, the electronic device 101 may selectively display at least one of the plurality of subjects in the content, such as the screens 430, 440, and 450 of FIGS. 4C to 4E. In order to selectively display at least one of a plurality of subjects, the electronic device 101 may display a list of the plurality of subjects in the screen 822. Based on the input based on the list, the electronic device 101 may selectively display at least one subject selected by the input. Since at least one of the subjects is selectively displayed in the display 140, an indication of another subject among the plurality of subjects may be at least temporarily ceased.

As described above, according to an embodiment, the electronic device 101 may expand the content, based on the size of the content displayed within the displaying area of the display 140 and/or the size of at least a portion of the displaying area occupied by the application for displaying the content. When the size of at least a portion of the content displayed in the displaying area is reduced, the electronic device 101 may cease to display the entire content and expand the content. Although the size of at least a portion of the electronic device 101 is reduced, at least one of the plurality of subjects may be maintained to be displayed by selectively displaying a plurality of captured subjects in the content. Since at least one of the plurality of subjects is maintained, the electronic device 101 may improve visibility of the plurality of subjects even though the size of a portion in the displaying area for displaying the content is reduced.

Figure 9:
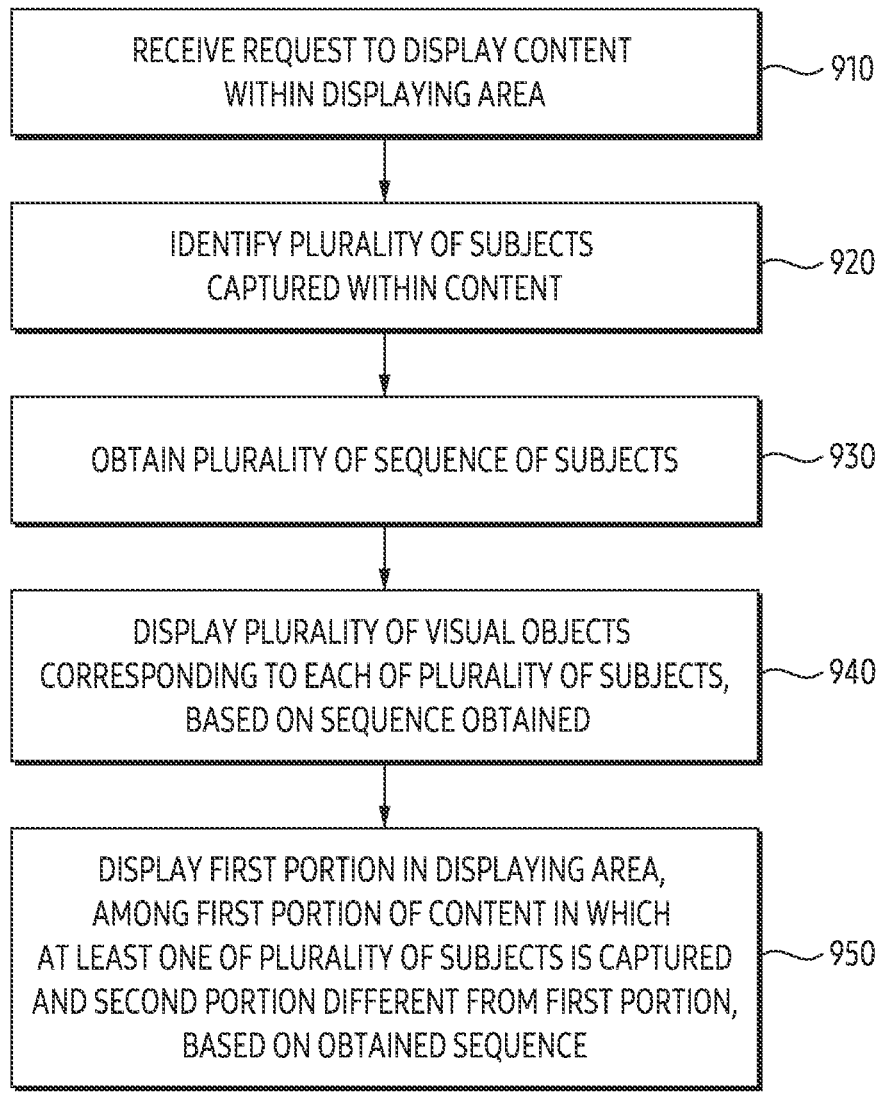
FIG. 9 is a flowchart for describing an operation performed by an electronic device based on one or more subjects captured in content, according to an embodiment.

FIG. 9 is a flowchart for describing an operation performed by an electronic device based on one or more subjects captured in content, according to an embodiment. The electronic device of FIG. 9 may be an example of the electronic device 101 of FIGS. 1 to 8. For example, at least one of the operations of FIG. 9 may be performed by the electronic device 101 of FIG. 1 and/or the processor 120 of FIG. 1.

Referring to FIG. 9, in operation 910, the electronic device may receive a request for displaying content in the displaying area. For example, the electronic device may display a list of a plurality of contents stored in the memory of the electronic device (e.g., the memory 130 of FIG. 1) as shown on the screen 410 of FIG. 4A. The electronic device may receive an input for selecting one content within the list. The content may include a photo and/or a video to be visually displayed in the displaying area of the display (e.g., the display 140 of FIG. 1) of the electronic device, as shown in the content 310 of FIG. 3.

Referring to FIG. 9, in operation 920, an electronic device according to an embodiment may identify a plurality of subjects captured in content. The electronic device may perform operation 920 in response to the request of operation 910. When the content includes a picture, the electronic device may obtain information indicating one or more subjects captured in the picture. When the content includes a video, the electronic device may obtain a position in which one or more subjects are captured within each of the frames included in the video. Identifying the subjects captured in the content by the electronic device may be performed based on metadata corresponding to the content and/or image recognition applied to the content.

Referring to FIG. 9, in operation 930, the electronic device according to an embodiment may obtain a sequence of the plurality of subjects. The sequence may indicate at least one subject to be preferentially displayed and/or expanded among the plurality of subjects. The sequence may be a sequence for displaying visual objects (e.g., visual objects of FIGS. 4A to 4E (434, 435, 436) corresponding to the plurality of subjects. According to an embodiment, the electronic device may obtain the sequence based on at least one of one or more tags included in the content or types of the plurality of subjects. According to an embodiment, the electronic device may obtain the sequence based on historical information indicating call connection, and/or the exchange of text messages between the user of the electronic device and at least one of the plurality of subjects. For example, the history information may include at least one of the number of times a call connection is established and/or the number of times a text message is exchanged between the user and the at least one subject.

Referring to FIG. 9, in operation 940, an electronic device according to an embodiment may display a plurality of visual objects corresponding to each of a plurality of subjects based on the obtained sequence. For example, in the displaying area, the electronic device may align the plurality of visual objects based on the sequence of operation 930. According to an embodiment, the electronic device may display at least one of a thumbnail or a text in at least one of the plurality of visual objects based on information related to each of the plurality of subjects. The thumbnail may include portions within the content in which the plurality of subjects are captured. The text may include text assigned to at least one of the plurality of subjects.

Referring to FIG. 9, in operation 950, according to an embodiment, the electronic device may display the first portion in the displaying area, among the first portion of the content in which at least one of the plurality of subjects is captured based on the obtained sequence, and the second portion different from the first portion. For example, the electronic device may expand the first portion in the displaying area. According to an embodiment, the electronic device may perform operation 950 in response to an input to the visual object 718 of FIG. 7A. While enlarging the first portion, the electronic device may emphasize at least one visual object corresponding to at least one subject captured in the first portion among the plurality of visual objects in operation 940, more than other visual objects.

According to an embodiment, the electronic device may perform operation 950 based on a width, a height, a size, and/or an extent of the displaying area. For example, in the first state where the size of the displaying area is less than the preset size by the insertion of the display, the electronic device may display the first portion among the first portion and the second portion together with the visual objects. In the above example, in the second state in which the size of the displaying area exceeds the preset size by the extraction of the display, the electronic device may display all of the first portion and the second portion. In the above example, in the first state, in response to the initiation of the extraction of the display, the electronic device may display all of the first portion and the second portion.

According to an embodiment, the electronic device may sequentially display frames included in the video in the displaying area while playing back the video in the content. While the frames are sequentially displayed based on the playback of the video in the displaying area, the electronic device may adjust at least one of content displayed in the displaying area, and/or a position or size of the first portion in the frame, based on at least one of the positions of subjects in the frames.

Figure 10:
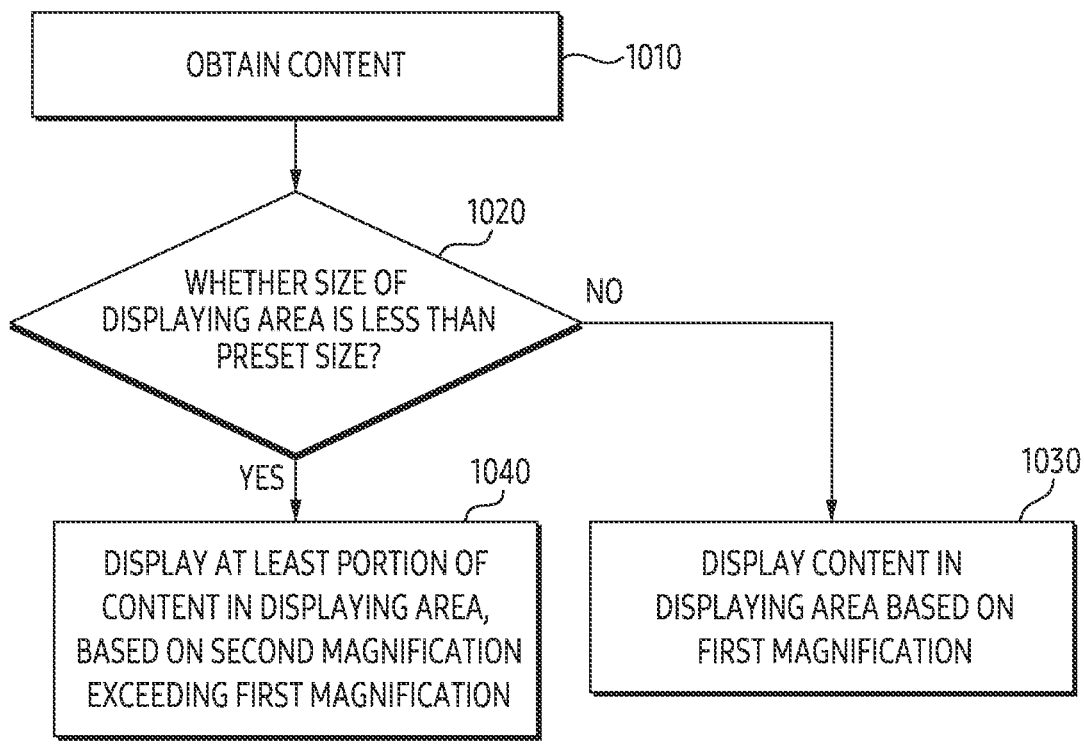
FIG. 10 is a flowchart for describing an operation in which an electronic device adjusts a magnification for displaying a content based on a size of a displaying area, according to an embodiment.

FIG. 10 is a flowchart for describing an operation in which an electronic device adjusts a magnification for displaying a content based on a size of a displaying area, according to an embodiment. The electronic device of FIG. 10 may be an example of the electronic device 101 of FIGS. 1 to 8 and/or the electronic device of FIG. 9. For example, at least one of the operations of FIG. 10 may be performed by the electronic device 101 of FIG. 1 and/or the processor 120 of FIG. 1. At least one of the operations of FIG. 10 may be related to the operation 950 of FIG. 9.

Referring to FIG. 10, in operation 1010, the electronic device according to an embodiment may obtain content. For example, the electronic device may identify content in which one or more subjects are captured, and stored in a memory (e.g., the memory 130 of FIG. 1). In the content, the electronic device may identify one or more subjects based on the operations of FIG. 9.

Referring to FIG. 10, in operation 1020, according to an embodiment, the electronic device may compare the size of the displaying area with the preset size. The size of the displaying area may be adjusted based on a shape of the electronic device and/or the display. The electronic device may insert the display into the housing of the electronic device or extract from the housing by using an actuator (e.g., the actuator 150 of FIG. 1). The size of the displaying area corresponding to a portion exposed to the outside of the display may be adjusted based on the insertion of the display or the extraction of the display. According to an embodiment, such as hall sensors, an electronic device may identify the size of the displaying area based on the sensor for identifying the shape of the electronic device and/or the display. The preset size may exceed the size of the displaying area of the electronic device in the roll-in state and may be equal to or less than the size of the displaying area of the electronic device in the roll-out state.

In response to identifying that the size of the displaying area is greater than or equal to the preset size (1020-NO), in operation 1030, according to an embodiment, the electronic device may display content in the displaying area based on the first magnification. Based on the first magnification, the electronic device may make the size of the content smaller than or equal to the size of the displaying area. Since the size of the content is adjusted to be equal to or less than the size of the displaying area, the electronic device may display the entire pixels included in the content in the displaying area. The state in which the electronic device displays content based on operation 1030 may include one state in which the screen 420 of FIG. 4B is displayed, the state 520 of FIG. 5, the state 610 of FIG. 6A, and/or the state 710 of FIG. 7A. In operation 1030, each of the corners of the content may be displayed in the corners of the preset area for browsing the content in the displaying area.

In response to identifying that the size of the displaying area is less than the preset size (1020-YES), in operation 1040, according to an embodiment, the electronic device may display at least a portion of the content in the displaying area based on a second magnification exceeding the first magnification of operation 1030. Since the second magnification of operation 1040 exceeds the first magnification of operation 1030, the electronic device may display content expanded than the content of operation 1030 based on operation 1040. According to an embodiment, the electronic device may display at least a portion of the content based on the second magnification in which one or more subjects are associated with a portion of the captured content and exceed the first magnification.

For example, the second magnification may be adjusted so that at least a portion of the content occupies an extent and/or size exceeding the preset ratio within the displaying area. Within a state in which one or more subjects display a portion of the captured content based on operation 1040, each of the corners of the portion of the content may be displayed at corners of a preset area for browsing content in the displaying area. According to an embodiment, within the state, the electronic device may display one or more visual objects (e.g., the visual objects 433, 434, 435, 436, and 437 of FIGS. 4C to 4E, and/or the visual objects 728 and 729 of FIG. 7B) corresponding to one or more subjects identified from the content.

Figure 11:
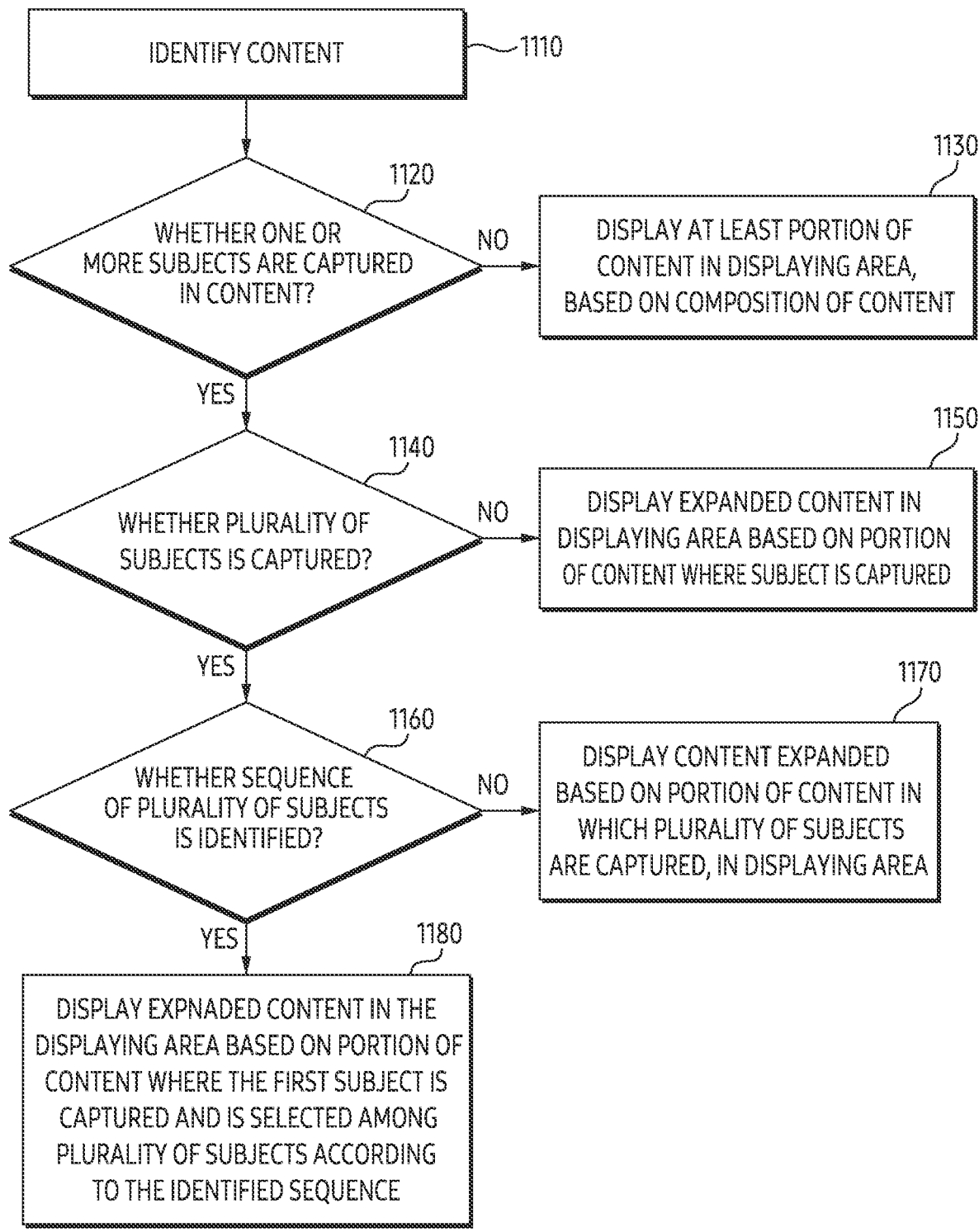
FIG. 11 is a flowchart for describing an operation performed by an electronic device to display content, according to an embodiment.

FIG. 11 is a flowchart for describing an operation performed by an electronic device to display content, according to an embodiment. The electronic device of FIG. 11 may be an example of the electronic device of FIGS. 1 to 10. For example, the operation of FIG. 11 may be performed by the electronic device 101 of FIG. 1 and/or the processor 120 of FIG. 1. For example, at least one of the operations of FIG. 11 may be performed while the width, height, size, and/or extent of the displaying area is less than the corresponding threshold, such as operation 1040 of FIG. 10 and/or state 200 of FIGS. 2A to 2B.

Referring to FIG. 11, in operation 1110, the electronic device according to an embodiment may identify content. For example, the electronic device may perform operation 1110 based on the received request based on operation 910 of FIG. 9.

Based on the identification of the content, within operation 1120, the electronic device according to an embodiment may identify whether one or more subjects are captured in the content. For example, the electronic device may identify one or more subjects captured in the content based on the information extracted from the content based on one or more tags and/or image recognition assigned to the content. For example, the electronic device may identify one or more subjects captured in the content based on preset categories indicating the type of subject.

When no subject is identified within the content (1120-NO), in operation 1130, according to an embodiment, the electronic device may display at least a portion of the content in the displaying area based on the composition of the content. For example, the electronic device may expand the content so that at least a portion of the content is displayed in the displaying area based on the preset ratio, as shown in the state 620 of FIG. 6B.

When at least one subject is identified in the content (1120-YES), in operation 1140, according to an embodiment, the electronic device may identify whether a plurality of subjects is captured. When a single subject is identified from the content (1140-NO), in operation 1150, according to an embodiment, the electronic device may display the expanded content in the displaying area based on the portion of the content where the subject is captured. In operation 1150, the electronic device may expand a portion in which the subject is captured in the displaying area. For example, in operation 1150, the width of the portion may match the width of the displaying area or may be less than or equal to the width of the displaying area, or the height of the portion may match the height of the displaying area, or may be less than or equal to the height of the displaying area. Since the electronic device according to an embodiment expands the portion on which the subject is captured based on operation 1150, the electronic device may maintain the visibility of the subject despite the reduction of the displaying area by the insertion of the display.

When a plurality of subjects are identified in the content (1140-YES), in operation 1160, the electronic device according to an embodiment may identify a sequence of the plurality of subjects. The identification of the sequence of the plurality of subjects by the electronic device may be performed based on operations 920 and 930 of FIGS. 3 and/or 9. When the sequence of a plurality of subjects is not identified (1160-NO), in operation 1170, according to an embodiment, the electronic device may display the expanded content based on the portion of the content where the plurality of subjects is captured in the displaying area. For example, the electronic device may expand portion of content in which all of a plurality of subjects are captured in the displaying area. As shown in the screen 450 of FIG. 4E, the electronic device may display a portion including all of the plurality of subjects and having a minimized area in the displaying area.

When a sequence of a plurality of subjects is identified (1160-YES), in operation 1180, according to an embodiment, the electronic device may display expanded content among a plurality of subjects in the displaying area, based on the portion of the content where the first subject is captured that is selected by the identified sequence. According to an embodiment, the electronic device may display a plurality of visual objects corresponding to a plurality of subjects together with the extended content. Among the plurality of visual objects, the electronic device may emphasize a specific visual object corresponding to the first subject more than other visual objects. According to an embodiment, the state in which the electronic device expands content based on operation 1180 may include the screens 430 and 440 of FIGS. 4C to 4D and/or the state 720 of FIG. 7B.

As described above, according to an embodiment, the electronic device may emphasize one or more subjects captured in the content. Emphasizing the one or more subjects by the electronic device may include an operation of expanding a portion where the one or more subjects are captured within the content. The electronic device may emphasize the one or more subjects based on the reduction of the displaying area by the transformation of the electronic device, and/or the display.

Hereinafter, referring to FIGS. 12A to 12D, and/or FIGS. 13A to 13B, an exemplary structure of an electronic device for transforming a display according to an embodiment will be described.

Figure 12A:
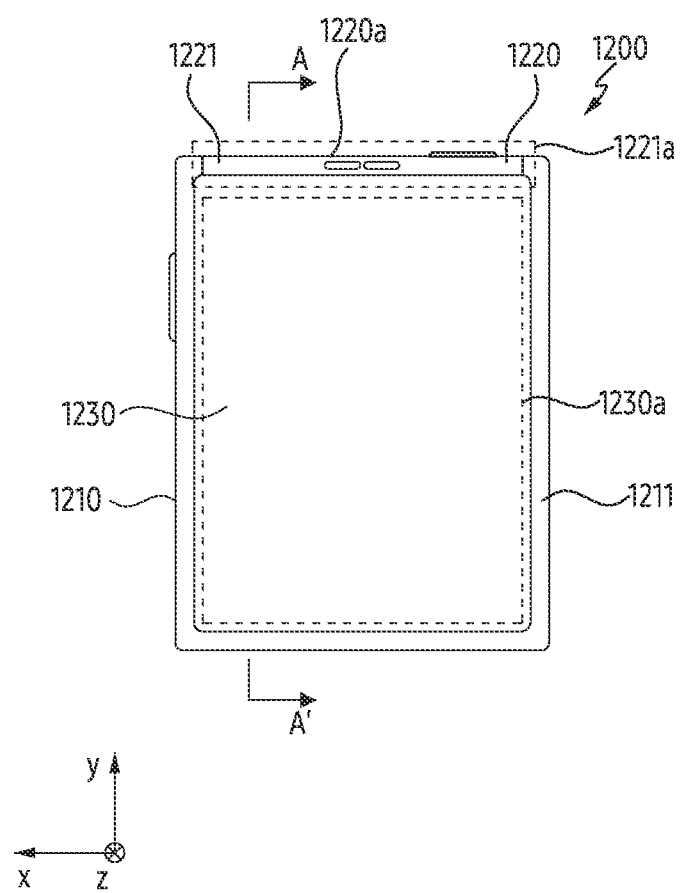
FIG. 12A is a front view of a first state of an electronic device according to an embodiment.
Figure 12B:
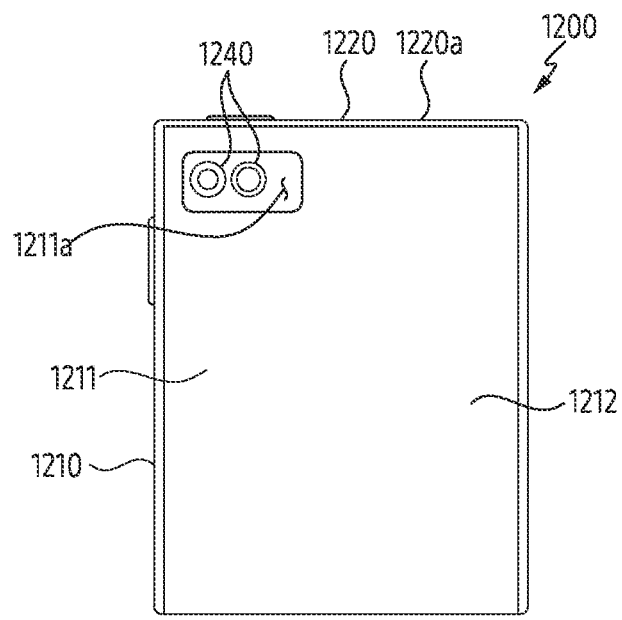
FIG. 12B is a rear view of a first state of an electronic device according to an embodiment.
Figure 12C:
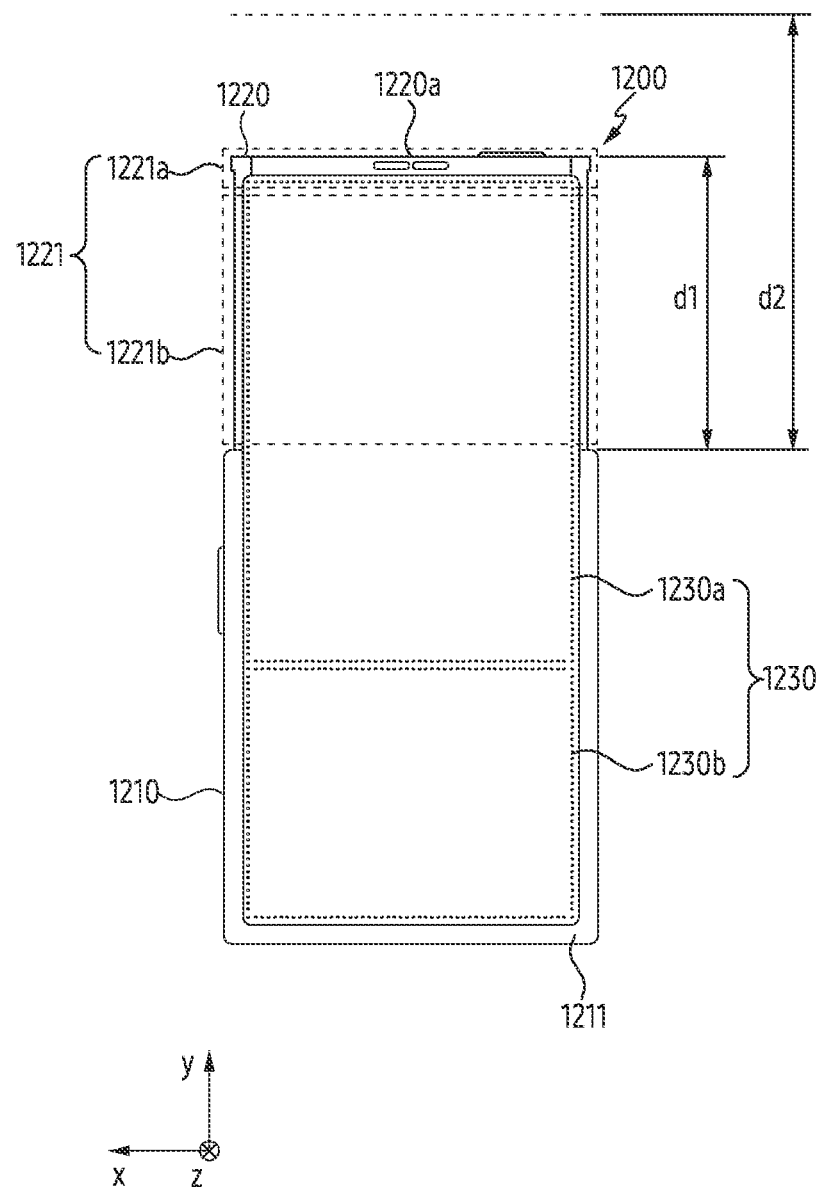
FIG. 12C is a front view of a second state of an electronic device according to an embodiment.
Figure 12D:
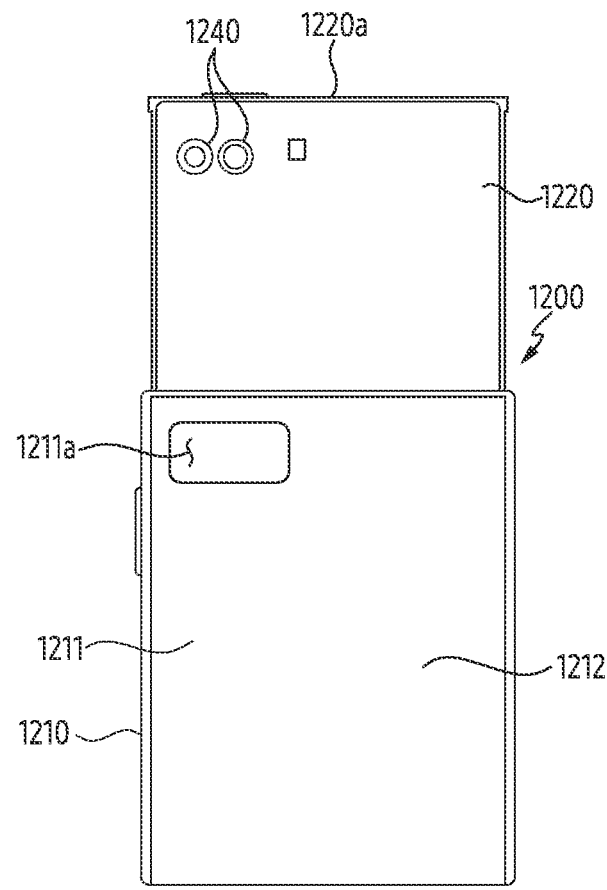
FIG. 12D is a rear view of the second state of an electronic device according to an embodiment.

FIG. 12A is a front view of a first state of an electronic device according to an embodiment, FIG. 12B is a rear view of a first state of an electronic device according to an embodiment, FIG. 12C is a front view of a second state of an electronic device according to an embodiment, and FIG. 12D is a rear view of the second state of the electronic device according to an embodiment.

Referring to FIGS. 12A, 12B, 12C, and 12D, the electronic device 1200 (e.g., electronic device 101 of FIG. 1) according to an embodiment may include a first housing 1210, a second housing 1220, a display 1230 (e.g., display 140 of FIG. 1), and a camera 1240. According to an embodiment, the second housing 1220 may be slidable with respect to the first housing 1210. For example, the second housing 1220 may move in a range within a preset distance along a first direction (e.g., +y direction) with respect to the first housing 1210. When the second housing 1220 moves along the first direction, a distance between the side surface 1220a of the second housing 1220 facing the first direction and the first housing 1210 may increase. For another example, the second housing 1220 may move in a range within a preset distance along a second direction (e.g., −y direction) opposite to the first direction with respect to the first housing 1210. When the second housing 1220 moves along the second direction, a distance between the side surface 1220a of the second housing 1220 facing the first direction and the first housing 1210 may be reduced. According to an embodiment, the second housing 1220 may linearly reciprocate with respect to the first housing 1210 by relatively sliding with respect to the first housing 1210. For example, at least a portion of the second housing 1220 may be insertable into the first housing 1210 or may be extractable from the first housing 1210.

According to an embodiment, the electronic device 1200 may be referred to as a "slidable electronic device" as the second housing 1220 is designed to be slidable with respect to the first housing 1210. According to an embodiment, the electronic device 1200 may be referred to as a "rollable electronic device" as at least a portion of the display 1230 is designed to be wound inside the second housing 1220 (or the first housing 1210) based on the slide movement of the second housing 1220.

According to an embodiment, the first state of the electronic device 1200 may be defined as a state in which the second housing 1220 moves in the second direction (e.g., a contracted state or the slide-in state). For example, in the first state of the electronic device 1200, it may not be substantially movable in the second direction. In the first state of the electronic device 1200, the distance between the side surface 1220a of the second housing 1220 and the first housing 1210 may be not reduced. For another example, in the first state of the electronic device 1200, a portion of the second housing 1220 may not be insertable. According to an embodiment, the first state of the electronic device 1200 may be a state in which the second area 1230b of the display 1230 is not visually exposed outside the electronic device 1200. For example, in the first state of the electronic device 1200, the second area 1230b of the display 1230 may be located inside the internal space (not illustrated) of the electronic device 1200 formed by the first housing 1210 and/or the second housing 1220, and may not be visible outside of the electronic device 1200.

According to an embodiment, the second state of the electronic device 1200 may be defined as a state in which the second housing 1220 has moved in the first direction (e.g., an extract state or the slide-out state). For example, in the second state of the electronic device 1200, the second housing 1220 may not be substantially movable in the first direction. In the second state of the electronic device 1200, the distance between the side surface 1220a of the second housing 1220 and the first housing 1210 may not increase. For another example, in the second state of the electronic device 1200, a portion of the second housing 1220 may not be extractable from the first housing 1210. According to an embodiment, the second state of the electronic device 1200 may be a state in which the second area 1230b of the display 1230 is visually exposed from the outside of the electronic device 1200. For example, in the second state of the electronic device 1200, the second area 1230b of the display 1230 may be extracted from the internal space of the electronic device 1200 and may be visible from the outside of the electronic device 1200.

According to an embodiment, in case that the second housing 1220 moves in the first direction from the first housing 1210, at least a portion of the second housing 1220 and/or the second area 1230b of the display 1230 may be extracted from the first housing 1210 by an extract length d1 corresponding to the moving distance of the second housing 1220. According to an embodiment, the second housing 1220 may reciprocate within a preset distance d2. According to an embodiment, the extract length d1 may have a size of approximately 0 to the preset distance d2.

According to on embodiment, the state of the electronic device 1200 may be convertible between the second state and/or the first state by the manual operation by the user, or by the automatic operation by a driving module (not shown) disposed inside the first housing 1210 or the second housing 1220. According to an embodiment, the driving module may trigger an operation based on a user input. According to an embodiment, a user input for triggering an operation of the driving module may include a touch input through the display 1230, a force touch input, and/or a gesture input. According to another embodiment, a user input for triggering an operation of the driving module may include an audio input (voice input) or an input of a physical button exposed to the outside of the first housing 1210 or the second housing 1220. According to an embodiment, the driving module may be driven in a semi-automatic manner, in which an operation is triggered when a manual operation due to an external force of the user is detected.

According to an embodiment, the first state of the electronic device 1200 may be referred to as a first shape, and the second state of the electronic device 1200 may be referred to as a second shape. For example, the first shape may include a normal state, a reduced state, or a closed state, and the second shape may include an open state. According to an embodiment, the electronic device 1200 may form a third state (e.g., an intermediate state) that is a state between the first state and the second state. For example, the third state may be referred to as a third shape, and the third shape may include a free stop state.

According to an embodiment, the display 1230 may be visible (or viewable) from the outside through the front direction (e.g., −z direction) of the electronic device 1200 so that visual information may be displayed to the user. For example, the display 1230 may include a flexible display. According to an embodiment, at least a portion of the display 1230 may be disposed in the second housing 1220, and may be extracted from an internal space (not illustrated) of the electronic device 1200 or may be inserted into the internal space of the electronic device 1200 according to the movement of the second housing 1220. The internal space of the electronic device 1200 may refer to a space in the first housing 1210 and the second housing 1220 formed by the combination of the first housing 1210 and the second housing 1220. For example, in the first state of the electronic device 1200, at least a portion of the display 1230 may be rolled into an internal space of the electronic device 1200 and inserted therein. In a state where at least a portion of the display 1230 is inserted into the internal space of the electronic device 1200, when the second housing 1220 moves in the first direction, at least a portion of the display 1230 may be extracted from the internal space of the electronic device 1200. For another example, when the second housing 1220 moves in the second direction, at least a portion of the display 1230 is rolled into the electronic device 1200, so that it may be inserted into the internal space of the electronic device 1200. As at least a portion of the display 1230 is extracted or inserted, the area of the display 1230 visible from the outside of the electronic device 1200 may be expanded or reduced. According to an embodiment, the display 1230 may include a first area 1230*a* and/or a second area 1230*b*.

According to an embodiment, the first area 1230*a* of the display 1230 may refer to an area of the display 1230 that may be fixedly visible from the outside of the electronic device 1200 regardless of whether the electronic device 1200 is in the second state or the first state. For example, the first area 1230*a* may refer to a partial area of the display 1230 that is not rolled into the internal space of the electronic device 1200. According to an embodiment, when the second housing 1220 moves, the first area 1230*a* may move together with the second housing 1220. For example, when the second housing 1220 moves along the first direction or the second direction, the first area 1230*a* may move along the first direction or the second direction on the front surface of the electronic device 1200 together with the second housing 1220.

According to an embodiment, as the second housing 1220 moves, the second area 1230*b* of the display 1230 may be inserted into the internal space of the electronic device 1200 or may be extracted from the internal space of the electronic device 1200 to the outside. For example, in the first state of the electronic device 1200, at least a portion of the second area 1230*b* of the display 1230 may be inserted into the internal space of the electronic device 1200, as the rolled state. In the first state of the electronic device 1200, the second area 1230*b* of the display 1230 is inserted into the internal space of the electronic device 1200 and may not be visible from the outside. For another example, the second area 1230*b* of the display 1230 may be in a state extracted from the internal space of the electronic device 1200 in the second state of the electronic device 1200. The second area 1230*b* of the display 1230 may be visible from the outside of the electronic device 1200 in the second state.

According to an embodiment, in the first state of the electronic device 1200, the area of the display 1230 visible from the outside of the electronic device 1200 may include only the first area 1230*a* of the display 1230. In the second state of the electronic device 1200, the area of the display 1230 visible from the outside of the electronic device 1200 may include at least a portion of the first area 1230*a* and the second area 1230*b* of the display 1230.

According to an embodiment, the first housing 1210 of the electronic device 1200 may include a first support member 1211 surrounding the internal space of the first housing 1210, a rear plate 1212 surrounding the rear surface of the first support member 1211, and a first side surface member 1214 surrounding at least a portion of an edge of the first support member 1211. According to an embodiment, the first support member 1211 may be integrally formed with the first side surface member 1214. The first support member 1211 may extend into the electronic device 1200 from at least a portion of one surface of the first side surface member 1214 facing the inside of the electronic device 1200. According to an embodiment, the first support member 1211 and the first side surface member 1214 may be integrally formed or made of the same material.

According to an embodiment, the second housing 1220 of the electronic device 1200 may include a second support member 1221 and a second side surface member 1229 surrounding the internal space of the electronic device 1200.

According to an embodiment, the second side surface member 1229 may form at least a portion of the side surface of the second housing 1220. The second support member 1221 may support an electronic device (e.g., camera 1240 and/or printed circuit board 1224) disposed in the second housing 1220. The second side surface member 1229 may surround at least a portion of the second support member 1221. According to an embodiment, the second support member 1221 may be integrally formed with the second side surface member 1229. The second support member 1221 may extend into the second housing 1220 from at least a portion of one surface of the second side surface member 1224 facing the inside of the second housing 1220. According to an embodiment, the second support member 1221 and the second side surface member 1229 may be integrally formed or made of the same material.

According to an embodiment, the second support member 1221 may include a first cover area 1221*a* of the second support member 1221 not inserted into the first housing 1210, and a second cover area 1221*b* inserted into or extracted from the first housing 1210. The first cover area 1221*a* of the second support member 1221 may always be visible regardless of whether the electronic device 1200 is in the second state or the first state. According to an embodiment, at least a portion of the first cover area 1221*a* of the second support member 1221 may form a side surface 1220*a* of the second housing 1220. According to an embodiment, the second cover area 1221*b* of the second housing 1220 may not be visible in the first state, but may be visible in the second state.

The camera 1240 may obtain an image of a subject based on receiving light from the outside of the electronic device 1200. According to an embodiment, the camera 1240 may include one or a plurality of lenses, an image sensor, and/or an image signal processor. According to an embodiment, the camera 1240 may be disposed in the second housing 1220 to face the rear surface of the electronic device 1200 opposite to the front surface of the electronic device 1200 in which the first area 1230*a* of the display 1230 is disposed. For example, the camera 1240 may be disposed in the second support member 1221 of the second housing 1220, and may be visible from the outside of the electronic device 1200 through the opening 1211*a* formed in the first support member 1211 when the electronic device 1200 is in the first state. For another example, the camera 1240 may be disposed in the second support member 1221 of the second housing 1220, and may not be visible from the outside of the electronic device 1200 because it is covered by the first support member 1211 and/or the rear surface plate 1212 when the electronic device 1200 is in the first state.

According to an embodiment, the camera 1240 may include a plurality of cameras. For example, the camera 1240 may include a wide-angle camera, an ultra-wide-angle camera, a telephoto camera, a proximity camera, and/or a depth camera. However, the camera 1240 is not necessarily limited to including a plurality of cameras, and may include one camera.

According to an embodiment, the camera 1240 may further include a camera (not illustrated) facing the front surface of the electronic device 1200 on which the first area 1230a of the display 1230 is disposed. In case that the camera 1240 faces the front surface of the electronic device 1200, the camera 1240 may be an under display camera (UDC) disposed under the display 1230 (e.g., +z direction from the display 1230), but is not limited thereto.

According to an embodiment, the electronic device 1200 may include a sensor module (not illustrated) and/or a camera module (not illustrated) disposed under the display 1230. The sensor module may detect an external environment based on information (e.g., light) received through the display 1230. According to an embodiment, the sensor module may include at least one of a receiver, a proximity sensor, an ultrasonic sensor, a gesture sensor, a gyro sensor, an air pressure sensor, a magnetic sensor, an acceleration sensor, a grip sensor, a color sensor, an IR (infrared) sensor, a biometric sensor, a temperature sensor, a humidity sensor, a motor encoder, or an indicator. According to an embodiment, at least some sensor modules of the electronic device 1200 may be visually exposed from the outside through a partial area of the display 1230. According to an embodiment, the electronic device 1200 may detect an extract length (e.g., length d1) using a sensor module. According to an embodiment, the electronic device 1200 may generate extract information on an extracted degree sensed by the sensor. For example, the electronic device 1200 may sense and/or identify the extracted degree of the second housing 1220 using the extract information. For example, the electronic device 1200 may detect and/or identify the extracted degree of the second housing 1220 using the extract information. According to an embodiment, the extract information may include information on an extract length of the second housing 1220.

According to an embodiment, the coupling form of the first housing 1210 and the second housing 1220 is not limited to the shapes and coupling illustrated in FIGS. 12A, 12B, 12C, and 12D, and may be implemented by a combination and/or coupling of other shapes or components.

Figure 13A:
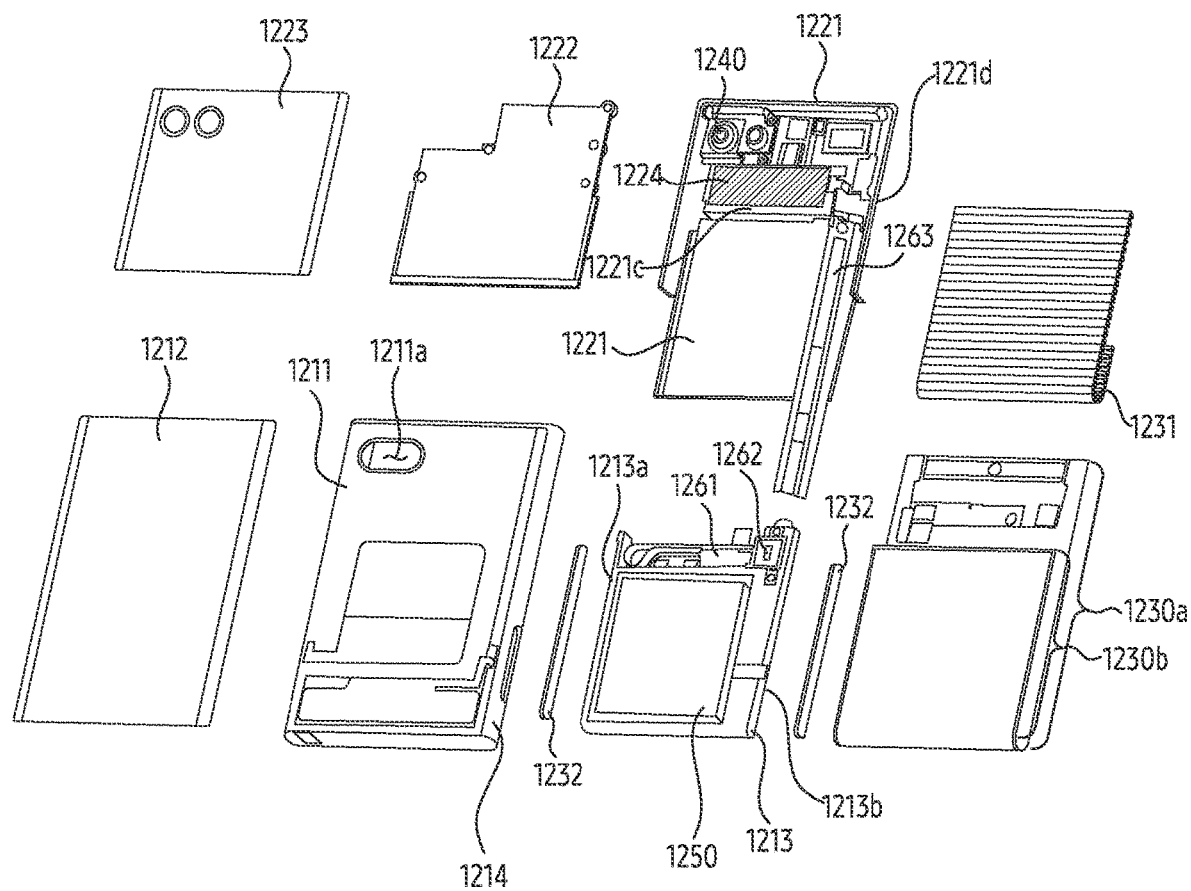
FIG. 13A is an exploded perspective view of an electronic device according to an embodiment.
Figure 13A:
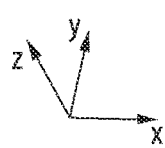
Figure 13B:
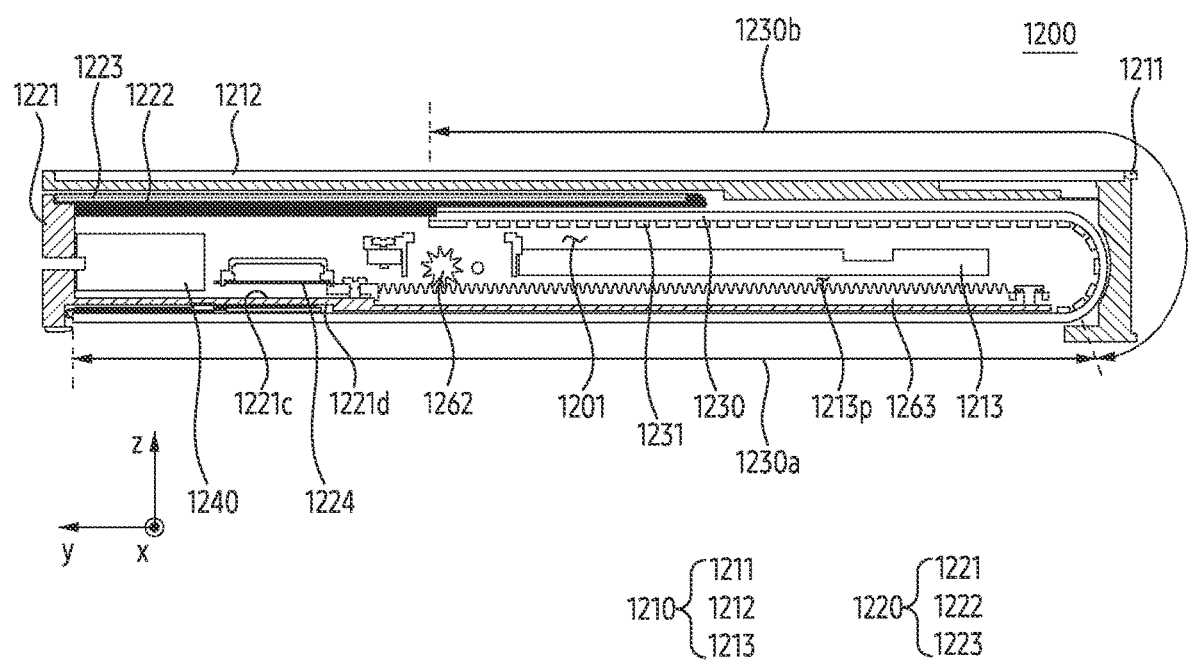
FIG. 13B is a cross-sectional view illustrating an example in which an electronic device according to an embodiment is cut along A-A' of FIG. 12A.

FIG. 13A is an exploded perspective view of an electronic device according to an embodiment, and FIG. 13B is a cross-sectional view illustrating an example in which an electronic device according to an embodiment is cut along A-A' of FIG. 12A.

Referring to FIGS. 13A and 13B, an electronic device 1200 according to an embodiment may include a first housing 1210, a second housing 1220, a display 1230, a camera 1240, a battery 1250 (e.g., battery 189 of FIG. 1), and/or a driving unit 1260. According to an embodiment, the first housing 1210 and the second housing 1220 may be coupled to each other to form an internal space 1201 of the electronic device 1200. For example, in the first state of the electronic device 1200, the second area 1230b of the display 1230 may be accommodated in the internal space 1201.

According to an embodiment, the first housing 1210 may include a first support member 1211, a rear plate 1212 and/or a third support member 1213. According to an embodiment, the first support member 1211, the rear plate 1212, and the third support member 1213 included in the first housing 1210 may be coupled to each other and may not move when the second housing 1220 moves with respect to the first housing 1210. According to an embodiment, the first support member 1211 may form at least a portion of an outer surface of the electronic device 1200. For example, the first support member 1211 may form at least a portion of the side surface of the electronic device 1200, and may form at least a portion of the rear surface of the electronic device 1200. According to an embodiment, the first support member 1211 may provide a surface on which the rear plate 1212 is seated. The rear plate 1212 may be mounted on one surface of the first support member 1211.

According to an embodiment, the third support member 1213 may support internal components of the electronic device 1200. For example, the third support member 1213 may accommodate the battery 1250 and the motor 1261 of the driving unit 1260. The battery 1250 and the motor 1261 may be accommodated in at least one of recesses or holes included in the third support member 1213. According to an embodiment, the third support member 1213 may be surrounded by the first support member 1211. For example, in the first state of the electronic device 1200, one surface 1213a of the third support member 1213 on which the battery 1250 is disposed may face the first support member 1211 and/or the second area 1230b of the display 1230. For another example, in the first state of the electronic device 1200, the other surface 1213b of the third support member 1213 facing the opposite direction to the one surface 1213a of the third support member 1213 may face the first area 1230a of the display 1230 or the second support member 1221. For example, the third support member 1213 may include aluminum as a material, but is not limited thereto.

According to an embodiment, the second housing 1220 may include a second support member 1221, a rear cover 1222, and/or a slide cover 1223. According to an embodiment, the second support member 1221, the rear cover 1222, and the slide cover 1223 may be coupled to each other and may move together with the second housing 1220 when the second housing 1220 relatively move with respect to the first housing 1210. The second support member 1221 may support internal components of the electronic device 1200. For example, the printed circuit board 1224 and/or the camera 1240 on which electronic components (e.g., processor 120 in FIG. 1) of the electronic device 1200 are disposed may be disposed on one surface 1221c of the second support member 1221 facing the internal space 1201. The other surface 1221d of the second support member 1221 facing in a direction opposite to the one surface 1221c of the second support member 1221 may face the first area 1230a of the display 1230 when the electronic device 1200 is in the first state. According to an embodiment, the rear cover 1222 may be coupled to the second support member 1221 to protect components of the electronic device 1200 disposed on the second support member 1221. For example, the rear cover 1222 may cover a portion of one surface 1221c of the second support member 1221. According to an embodiment, the slide cover 1223 may be disposed on the rear cover 1222 to form an outer surface of the electronic device 1200 together with the rear plate 1212 and the first support member 1211. The slide cover 1223 may be coupled to one surface of the rear cover 1222 or the second support member 1221 to protect the rear cover 1222 and/or the second support member 1221.

According to an embodiment, when the electronic device 1200 is in the first state, the display 1230 may be bent by at least partially being rolled into the internal space 1201. According to an embodiment, the display 1230 may cover at least a portion of the third support member 1213, and at least a portion of the second support member 1221. For example, when the electronic device 1200 is in the first state, the display 1230 may cover the other surface 1221d of the second support member 1221, may pass between the second support member 1221 and the first support member 1211, and may extend toward the internal space 1201. At least a portion of the display 1230 may surround at least a portion of the third support member 1213, after passing between the second support member 1221 and the first support member 1211. The display 1230 may cover one surface 1213a of the third support member 1213 in the internal space 1201. According to an embodiment, when the second housing 1220 moves in the first direction, the second area 1230b of the display 1230 may be extracted from the internal space 1201. For example, as the second housing 1220 moves in the second direction, the display 1230 may pass between the second support member 1221 and the first support member 1211, and may be extracted from the internal space 1201.

According to an embodiment, the electronic device 1200 may include a support bar 1231 for supporting the display 1230 and a guide rail 1232. For example, the support bar 1231 may include a plurality of bars coupled to each other and may be manufactured in a shape corresponding to the shape of the second area 1230b of the display 1230. According to an embodiment, as the display 1230 moves, the support bar 1231 may move together with the display 1230. According to an embodiment, in the first state in which the second area 1230b of the display 1230 is wound in the internal space 1201, the support bar 1231 may be wound in the internal space 1201 together with the second area 1230b of the display 1230. As the second housing 1220 moves in the first direction, the support bar 1231 may move together with the second area 1230b of the display 1230. According to an embodiment, the guide rail 1232 may guide the movement of the support bar 1231. For example, as the display 1230 moves, the support bar 1231 may move along the guide rail 1232 coupled to the third support member 1213. According to an embodiment, the guide rail 1232 may be coupled to the third support member 1213 or the first support member 1211. For example, the guide rail 1232 may include a plurality of guide rails 1232 disposed to be spaced apart from each other at both edges of the third support member 1213 spaced apart from each other along a third direction perpendicular to the first direction (e.g., +x direction).

According to an embodiment, the driving unit 1260 may provide a driving force to the second housing 1220 so that the second housing 1220 may relatively move with respect to the first housing 1210. According to an embodiment, the driving unit 1260 may include a motor 1261, a pinion gear 1262, and/or a rack gear 1263. The motor 1261 may receive power from the battery 1250 and may provide a driving force to the second housing 1220. According to an embodiment, the motor 1261 may be disposed in the first housing 1210 and not move when the second housing 1220 moves with respect to the first housing 1210. For example, the motor 1261 may be disposed in a recess formed in the third support member 1213. According to an embodiment, the pinion gear 1262 is coupled to the motor 1261 and may rotate by a driving force provided from the motor 1261. According to an embodiment, the rack gear 1263 may engage with the pinion gear 1262, and may move according to rotation of the pinion gear 1262. For example, the rack gear 1263 may reciprocate linearly in the first direction or the second direction according to the rotation of the pinion gear 1262. According to an embodiment, the rack gear 1263 may be disposed in the second housing 1220. For example, the rack gear 1263 may be coupled to the second support member 1221 included in the second housing 1220. According to an embodiment, the rack gear 1263 may be movable inside the operating space 1213p formed in the third support member 1213.

According to an embodiment, when the pinion gear 1262 rotates along the first rotation direction (e.g., clockwise direction in FIG. 13B), the rack gear 1263 may move in the first direction (e.g., +y direction). When the rack gear 1263 moves along the first direction, the second housing 1220 coupled to the rack gear 1263 may move along the first direction. As the second housing 1220 moves along the first direction, the area of the display 1230 visible from the outside of the electronic device 1200 may be expanded. When the pinion gear 1262 rotates along the second rotation direction (e.g., counterclockwise direction in FIG. 13B), the rack gear 1263 may move in the second direction (e.g., −y direction). When the rack gear 1263 moves along the second direction, the second housing 1220 coupled to the rack gear 1263 may move along the second direction. As the second housing 1220 moves along the second direction, the area of the display 1230 visible from the outside of the electronic device 1200 may be reduced.

In the above description, it has been described that the motor 1261 and the pinion gear 1262 are disposed in the first housing 1210, and the rack gear 1263 is disposed in the second housing 1220, but embodiments may not be limited thereto. According to embodiments, the motor 1261 and the pinion gear 1262 may be disposed in the second housing 1220 and the rack gear 1263 may be disposed in the first housing 1210.

In an electronic device including an actuator that transforms a flexible display, a method for displaying a content may be required for the electronic device based on a width and/or height of the displaying area adjusted by the flexible display. As described above, according to an embodiment, an electronic device may comprise a housing; a display; an actuator for adjust a displaying area of the display, by inserting the display into the housing, or by extracting the display from the housing; a memory for storing instructions; at least one processor operably coupled to the display, the actuator, and the memory. The at least one processor may be configured to, when the instructions are executed, receive a request for displaying a content in the displaying area. The at least one processor may be configured to identify, in response to the request, a plurality of subjects captured in the content. The at least one processor may be configured to obtain, in response to identification of the plurality of subjects from the content, a sequence of the plurality of subjects. The at least one processor may be configured to display, a plurality of visual objects respectively corresponding to the plurality of subjects in the displaying area based on the obtained sequence. The at least one processor may be configured to display, among a first portion of the content in which at least one subject selected based on the sequence among the plurality of subjects is captured and a second portion of the content different from the first portion, the first portion with the plurality of visual objects in the displaying area, based on a size of the displaying area controlled by the actuator. According to an embodiment, an electronic device can expand and/or reduce, and display a content displayed in the displaying area, based on a size of the displaying area adjusted by an actuator. According to an embodiment, the electronic device can expand the content to being included one or more subjects captured within the content.

For example, the at least one processor may be configured to, when the instructions are executed, in a first state where a size of the displaying area is smaller than a preset size by insertion of the display, display, in response to the request, the first portion among the first portion and the second portion with the plurality of visual objects. For example, the at least one processor may be configured to, in a second state where the size of the displaying area is larger than the preset size by extraction of the display, display, in response to the request, the first portion and the second portion in the displaying area.

For example, the at least one processor may be configured to, when the instructions are executed, display, in response to initiation of the insertion of the display in the first state, both of the first portion and the second portion in the displaying area.

For example, the at least one processor may be configured to, when the instructions are executed receive an input selecting, among the plurality of visual objects including a first visual object corresponding to a first subject captured in the first portion, a second visual object different from the first visual object. The at least one processor may be configured to, in response to receiving the input, display, in the displaying area, a third portion where a second subject corresponding to the second visual object is captured, and different from the first portion.

For example, the at least one processor may be configured to, when the instructions are executed, obtain the sequence based on at least one of one or more tags included in the content, or types of the plurality of subjects.

For example, the at least one processor may be configured to, when the instructions are executed, obtain the sequence based on call connection between a user of the electronic device and at least one subject among the plurality of subjects, or exchanging of a text message.

For example, the at least one processor may be configured to, when the instructions are executed, obtain, in response to the request for displaying the content corresponding to video, locations of a first subject among the plurality of subjects in each of frames included in the video. The at least one processor may be configured to, adjust, while sequentially displaying the frames based on playback of the video in the displaying area, based on at least one of the obtained locations, at least one of a location or a size of the first portion in the content.

For example, the at least one processor may be configured to, when the instructions are executed, display, based on information associated with each of the identified plurality of subjects, at least one of a thumbnail or a text in at least one of the plurality of visual objects.

As described above, according to an embodiment, an electronic device may comprise a housing; a display; an actuator for adjust a displaying area of the display, by inserting the display into the housing, or by extracting the display from the housing; a memory for storing instructions; at least one processor operably coupled to the display, the actuator, and the memory. The at least one processor may be configured to, when the instructions are executed, identify a content in which one or more subjects are captured, and is stored in the memory. The at least one processor may be configured to obtain a size of the displaying area that is adjusted based on the insertion of the display, or the extraction of the display. The at least one processor may be configured to display, in a first state in which the size of the displaying area is greater than a preset size, the content based on a first magnification making the content having a size smaller than the size of the displaying area. The at least one processor may be configured to display, in a second state in which the size of the displaying area is smaller than a preset size, at least portion of the content based on a second magnification which is associated with a portion of the content where the one or more subjects are captured, and is greater than the first magnification.

For example, the at least one processor may be configured to, when the instructions are executed, in the first state, display corners of the content matched to corners of a preset area for browsing the content in the displaying area. The at least one processor may be configured to, in the second state, display corners of a portion of the content which are matched to the corners of the preset area.

For example, the at least one processor may be configured to, when the instructions are executed, display, in response to identifying a plurality of subjects from the content in the second state, a plurality of visual objects corresponding to each of the plurality of visual objects with a portion of the content displayed based on the second magnification.

For example, the at least one processor may be configured to, when the instructions are executed, obtain, in response to identifying the plurality of subjects, a sequence of the plurality of subjects. The at least one processor may be configured to display, based on the obtained sequence, the plurality of visual objects.

For example, the at least one processor may be configured to, when the instructions are executed, in the second state, receive, while displaying a first portion of the content where a first subject corresponding to a first visual object is captured among the plurality of visual objects is captured, an input for selecting a second visual object different from the first visual object. The at least one processor may be configured to, display, in response to the received input, a second portion where a second subject corresponding to the second visual object in the content is captured, in the displaying area.

For example, the at least one processor may be configured to, when the instructions are executed, in the second state, display, with at least portion of the content, one or more visual objects including a thumbnail or text corresponding to the one or more subjects.

For example, the at least one processor may be configured to, when the instructions are executed, in the first state, display, in response to receiving an input for reducing a size of the displaying area to be lower than the preset size based on the insertion of the display, at least portion of the content based on the second magnification.

As described above, according to an embodiment, a method of an electronic device may comprise receiving a request for displaying a content in a displaying area of a display of the electronic device. The method of the electronic device may comprise identifying, in response to the request, a plurality of subjects which are captured in the content. The method of the electronic device may comprise obtaining, in response to identifying the plurality of subjects from the content, a sequence of the plurality of subjects. The method of the electronic device may comprise displaying, in the displaying area based on the obtained sequence, the plurality of visual objects corresponding to each of the plurality of subjects. The method of the electronic device may comprise displaying, based on a size of the displaying area that is controlled by an actuator of the electronic device for transforming the display, among a first portion of the content where at least one subject selected based on the sequence among the plurality of subjects are capture, or a second portion of the content different from the first portion, the first portion with the plurality of visual objects in the displaying area.

For example, the displaying the first portion may be performed in a first state where a size of the displaying area is smaller than a preset size by an insertion of the display into a housing of the electronic device. The method of the electronic device may further comprise displaying, in response to the request in a second state where the size of the displaying area is larger than the preset size by an extraction of the display, the first portion and the second portion in the displaying area.

For example, the method of the electronic device may further comprise receiving, among the plurality of visual objects including a first visual object corresponding to a first subject captured in the first portion, an input for selecting a second visual object different from the first visual object. The method of the electronic device may further comprise displaying, in the displaying area in response to receiving the input, a third portion where a second subject corresponding to the second visual object is captured, and different from the first portion.

For example, the obtaining the sequence may comprise obtaining the sequence based on at least one of one or more tags included in the content, or types of the plurality of subjects.

For example, the method of the electronic device may comprise obtaining the sequence, based on a call connection between a user of the electronic device and at least one subject among the plurality of subjects, or exchanging a text message.

For example, the operation of displaying the plurality of visual objects may include an operation of displaying at least one of a thumbnail or a text within at least one of the plurality of visual objects based on information related to each of the identified plurality of subjects.

As described above, according to an embodiment, a method of an electronic device may comprise identifying a content in which one or more subjects are captured. The method of the electronic device may comprise obtaining a size of the displaying area that is adjusted, based on insertion of the display of the electronic device into the housing of the electronic device, or extraction from the housing of the display. The method of the electronic device may comprise displaying, in a first state in which the size of the displaying area is greater than a preset size, the content based on a first magnification making the content having a size smaller than the size of the displaying area. The method of the electronic device may comprise displaying, in a second state in which the size of the displaying area is smaller than a preset size, at least portion of the content based on a second magnification which is associated with a portion of the content where the one or more subjects are captured, and is greater than the first magnification.

For example, the operation of displaying the content may comprise, in the first state, displaying corners of the content matched to corners of a preset area for browsing the content in the displaying area. For example, the operation of displaying the content may comprise, in the second state, displaying corners of a portion of the content which are matched to the corners of the preset area.

For example, the operation of displaying the content may comprise displaying, in response to identifying a plurality of subjects from the content, in the second state, a plurality of visual objects respectively corresponding to the plurality of visual objects with a portion of the content displayed based on the second magnification.

For example, the operation of displaying the content may comprise obtaining, in response to identifying the plurality of subjects, a sequence of the plurality of subjects. For example, the operation of displaying the content may comprise displaying, based on the obtained sequence, the plurality of visual objects.

For example, the operation of displaying the content may comprise in the second state, receiving, while displaying a first portion of the content where a first subject corresponding to a first visual object is captured among the plurality of visual objects, an input for selecting a second visual object different from the first visual object. For example, the operation of displaying the content may comprise displaying, in response to the received input, a second portion where a second subject corresponding to the second visual object in the content is captured, in the displaying area.

As described above, according to an embodiment, an electronic device may comprise a housing, a display, an actuator configured to adjust an active area of the display by controlling a position of the display relative to the housing, a memory for storing instructions and at least one processor operably coupled to the display, the actuator, and the memory. The at least one processor may be configured to execute the instructions to, receive a request for displaying a content in the active area. The at least one processor may be configured to execute the instructions to identify, based on the request, a plurality of subjects associated with the content. The at least one processor may be configured to execute the instructions to obtain, based on the identification of the plurality of subjects from the content, a sequence of the plurality of subjects. The at least one processor may be configured to execute the instructions to display, in the active area of the display, a plurality of visual objects respectively corresponding to the plurality of subjects based on the sequence, and display the content according to a first magnification. The at least one processor may be configured to execute the instructions to display, based on a size of the active area controlled by the actuator, among a first portion of the content corresponding to at least one subject selected based on the sequence and a second portion of the content different from the first portion, the first portion with the plurality of visual objects in the active area by adjusting a magnification of the content from the first magnification to a second magnification that is greater than the first magnification.

For example, the at least one processor may be configured to execute the instructions to display, based on the display being in a first state in which a size of the active area is smaller than a preset size, the first portion of the content with the plurality of visual objects. The at least one processor may be configured to execute the instructions to display, based on the display being in a second state in which the size of the active area is larger than the preset size, the first portion of the content and the second portion of the content different from the first portion.

For example, the at least one processor may be configured to execute the instructions to display, based on an extraction of the display in the first state, the first portion and the second portion in the active area.

For example, the at least one processor may be configured to execute the instructions to receive an input selecting a second visual object different from a first visual object of the plurality of visual objects, the first visual object corresponding to a first subject captured in the first portion. The at least one processor may be configured to execute the instructions to display, based on the input, in the active area, a third portion of the content corresponding to the second visual object. The second visual object corresponding to a second subject captured in the third portion.

For example, the at least one processor may be configured to execute the instructions to obtain the priorities of the plurality of visual objects in the sequence based on at least one of a tag included in the content and types or categories of the plurality of subjects, positions of the plurality of subjects in the content, a focal distance of the content, a zoom magnification of the content, account information associated with at least one of the plurality of subjects and movements of the plurality of subjects identified by the content.

For example, the at least one processor may be configured to execute the instructions to obtain the priorities of the plurality of visual objects in the sequence based on at least one of a call connection or an exchange of a text message between a user of the electronic device and at least one subject of the plurality of subjects.

For example, the at least one processor may be configured to execute the instructions to obtain, based on the content corresponding to a video comprising frames, locations of a first subject of the plurality of subjects in each of the frames in the video. The at least one processor may be configured to execute the instructions to adjust, based on at least one of the locations of the first subject, at least one of a location or a size of the first portion while sequentially displaying the frames in the video in the active area.

For example, the at least one processor may be configured to execute the instructions to display, based on information associated with each of the plurality of subjects, at least one of a thumbnail or a text in at least one of the plurality of visual objects.

As described above, according to an embodiment, an electronic device may comprise a housing; a display; an actuator configured to adjust an active area of the display by controlling a position of the display relative to the housing; a memory for storing instructions; and at least one processor operably coupled to the display, the actuator, and the memory. The at least one processor is configured to execute the instructions to identify a content stored in the memory, the content is associated with at least one subject. The at least one processor is configured to execute the instructions to obtain a size of the active area that is adjusted based on at least one of an insertion of the display into the housing and an extraction of the display from the housing. The at least one processor is configured to display, based on the display being in a first state in which the size of the active area is greater than a preset size, the content based on a first magnification of the content. The at least one processor is configured to display, based on the display being in a second state in which the size of the active area is smaller than the preset size, display at least a portion of the content based on a second magnification which is associated with a location corresponding to the at least one subject, and is greater than the first magnification.

For example, the at least one processor may be configured to execute the instructions to display, based on the display being in the first state, corner of a preset area for browsing the content in the active area. The at least one processor may be configured to execute the instructions to display, based on the display being in the second state, corner of the preset area.

For example, the at least one processor may be configured to execute the instructions to display, based on identifying a plurality of subjects from the content in the second state, in the active area, a plurality of visual objects corresponding to each of the plurality of subjects with the portion of the content based on the second magnification.

For example, the at least one processor may be configured to execute the instructions to obtain, based on identifying the plurality of subjects, a sequence of the plurality of subjects. The at least one processor may be configured to execute the instructions to display the plurality of visual objects based on the sequence.

For example, the at least one processor may be configured to execute the instructions to receive, based on the display being in the second state and displaying a first portion of the content comprising a first subject corresponding to a first visual object of the plurality of visual objects, an input for selecting a second visual object different from the first visual object. The at least one processor may be configured to execute the instructions to display, based on the received input, in the active area, a second portion of the content comprising a second subject corresponding to the second visual object, in the active area.

For example, the at least one processor may be configured to execute the instructions to display, based on the display being in the second state, at least one visual object with the portion of the content based on the second magnification. The at least one visual object may comprise at least one of a thumbnail or text corresponding to the at least one captured subject.

For example, the at least one processor may be configured to execute the instructions to display, based on the display being in the first state, and receiving an input for reducing the size of the active area to be less than the preset size, the portion of the content based on the second magnification.

As described above, according to an embodiment, a method of an electronic device may comprise receiving a request for displaying a content in an active area of a display of the electronic device. The method may comprise identifying, based on the request, a plurality of subjects associated with the content. The method may comprise obtaining, based on identifying the plurality of subjects from the content, priorities of the plurality of subjects. The method may comprise displaying, based on the priorities, in the active area of the display, a plurality of visual objects corresponding to each of the plurality of subjects, and displaying the content according to a first magnification. The method may comprise adjusting a size of the active area by controlling an actuator to transform the display. The method may comprise displaying, based on a size of the active area that is controlled by the actuator, among a first portion of the content corresponding to at least one subject selected based on the sequence among the plurality of subjects, or a second portion of the content different from the first portion, the first portion with the plurality of visual objects in the active area by adjusting a magnification of the content from the first magnification to a second magnification that is greater than the first magnification.

For example, the operation of the displaying the first portion of the content may comprise, displaying the first portion based on the display being in a first state in which the size of the active area is smaller than a preset size; and displaying the first portion and the second portion of the content, based on the display being in a second state in which the size of the active area is larger than the preset size.

For example, the method may further comprise, receiving an input for selecting a second visual object different from a first visual object of the plurality of visual objects, the first visual object corresponding to a first subject captured in the first portion. The method may further comprise, displaying, based on the input, in the active area, a third portion of the content corresponding to the second visual object, the second visual object corresponding to a second subject captured in the third portion.

For example, the operation of the obtaining the sequence of the plurality of subjects may comprise, obtaining the priorities of the plurality of visual objects in the sequence based on at least one of a tag included in the content, or types or categories of the plurality of subjects, positions of the plurality of subjects in the content, a focal distance of the content, a zoom magnification of the content, account information associated with at least one of the plurality of subjects and movements of the plurality of subjects identified by the content. The operation of the obtaining the sequence of the plurality of subjects may comprise, obtaining the priorities of the plurality of visual objects in the sequence based on at least one of a call connection or exchanging a text message between a user of the electronic device and at least one subject of the plurality of subjects.

For example, the operation of the displaying the first portion of the content may comprise, obtaining, based on the content corresponding to a video comprising frames, locations of a first subject of the plurality of subjects, in each of the frames in the video. The operation of the displaying the first portion of the content may comprise, adjusting, while sequentially displaying the frames based on playback of the video in the active area, at least one of a position or the size of the first portion in the content based on at least one of the obtained locations.

For example, the operation of displaying the first portion based on the size of the active area may comprise, displaying, based on the display being in a first state in which a size of the active area is smaller than a preset size, the first portion of the content with the plurality of visual objects.

For example, the method may comprise, displaying, based on the display being in a second state in which the size of the active area is larger than the preset size, the first portion of the content and the second portion of the content different from the first portion.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:
1. An electronic device comprising:
a housing;
a display;
an actuator configured to adjust an active area of the display by controlling a position of the display relative to the housing;
a memory for storing instructions; and
at least one processor operably coupled to the display, the actuator, and the memory, the at least one processor configured to execute the instructions to:
receive a request for displaying a content in the active area,
identify, based on the request, a plurality of subjects associated with the content,
obtain, based on the identification of the plurality of subjects from the content, a sequence of the plurality of subjects,
display, in the active area of the display, a plurality of visual objects respectively corresponding to the plurality of subjects based on the sequence and display the content according to a first magnification, and
display, based on a size of the active area controlled by the actuator, among a first portion of the content corresponding to at least one subject of the plurality of subjects being selected based on the sequence and a second portion of the content different from the first portion, the first portion with the plurality of visual objects in the active area by adjusting a magnification of the content from the first magnification to a second magnification that is greater than the first magnification.

2. The electronic device of claim 1, wherein the at least one processor is further configured to execute the instructions to:

based on the display being in a first state in which the size of the active area is smaller than a preset size, display the first portion of the content with the plurality of visual objects, and based on the display being in a second state in which the size of the active area is larger than the preset size, display the first portion of the content and the second portion of the content different from the first portion.

3. The electronic device of claim 2, wherein the at least one processor is further configured to execute the instructions to:

based on an extraction of the display in the first state, display the first portion and the second portion in the active area.

4. The electronic device of claim 1, wherein the at least one processor is further configured to execute the instructions to:

receive an input selecting a second visual object different from a first visual object of the plurality of visual objects, the first visual object corresponding to a first subject captured in the first portion, and based on the input, display, in the active area, a third portion of the content corresponding to the second visual object, the second visual object corresponding to a second subject captured in the third portion.

5. The electronic device of claim 1, wherein the at least one processor is further configured to execute the instructions to:

obtain priorities of the plurality of visual objects in the sequence based on at least one of a tag included in the content and types or categories of the plurality of subjects, positions of the plurality of subjects in the content, a focal distance of the content, a zoom magnification of the content, account information associated with at least one of the plurality of subjects and movements of the plurality of subjects identified by the content.

6. The electronic device of claim 1, wherein the at least one processor is further configured to execute the instructions to:

obtain priorities of the plurality of visual objects in the sequence based on at least one of a call connection or an exchange of a text message between a user of the electronic device and at least one subject of the plurality of subjects.

7. The electronic device of claim 1, wherein the at least one processor is further configured to execute the instructions to:

based on the content corresponding to a video comprising frames, obtain locations of a first subject of the plurality of subjects in each of the frames in the video, and based on at least one of the locations of the first subject, adjust at least one of a location or a size of the first portion while sequentially displaying the frames in the video in the active area.

8. The electronic device of claim 1, wherein the at least one processor is further configured to execute the instructions to:

based on information associated with each of the plurality of subjects, display at least one of a thumbnail or a text in at least one of the plurality of visual objects.

9. A method of an electronic device, the method comprising:

receiving a request for displaying a content in an active area of a display of the electronic device;

based on the request, identifying a plurality of subjects associated with the content;

based on identifying the plurality of subjects from the content, obtaining a sequence of the plurality of subjects;

based on the sequence, displaying, in the active area of the display, a plurality of visual objects corresponding to each of the plurality of subjects, and displaying the content according to a first magnification;

adjusting a size of the active area by controlling an actuator to transform the display; and displaying, based on the size of the active area that is controlled by the actuator of the electronic device for transforming the display, among a first portion of the content corresponding to at least one subject selected based on the sequence among the plurality of subjects, or a second portion of the content different from the first portion, the first portion with the plurality of visual objects in the active area by adjusting a magnification of the content from the first magnification to a second magnification that is greater than the first magnification.

10. The method of claim 9, wherein the displaying the first portion of the content comprises:

displaying the first portion based on the display being in a first state in which the size of the active area is smaller than a preset size; and displaying the first portion and the second portion of the content, based on the display being in a second state in which the size of the active area is larger than the preset size.

11. The method of claim 9, further comprising:

receiving an input for selecting a second visual object different from a first visual object of the plurality of visual objects, the first visual object corresponding to a first subject captured in the first portion; and based on the input, displaying, in the active area, a third portion of the content corresponding to the second visual object, the second visual object corresponding to a second subject captured in the third portion.

12. The method of claim 9, wherein the obtaining the sequence of the plurality of subjects comprises:

obtaining priorities of the plurality of visual objects in the sequence based on at least one of a tag included in the content, or types or categories of the plurality of subjects, positions of the plurality of subjects in the content, a focal distance of the content, a zoom magnification of the content, account information associated with at least one of the plurality of subjects and movements of the plurality of subjects identified by the content; and obtaining the priorities of the plurality of visual objects in the sequence based on at least one of a call connection or exchanging a text message between a user of the electronic device and at least one subject of the plurality of subjects.

13. The method of claim 9, wherein the displaying the first portion of the content comprises:

based on the content corresponding to a video comprising frames, obtaining locations of a first subject of the plurality of subjects, in each of the frames in the video; and adjusting, while sequentially displaying the frames based on playback of the video in the active area, at least one of a position or the size of the first portion in the content based on at least one of the obtained locations.

* * * * *